(12) United States Patent
Choi

(10) Patent No.: US 11,472,462 B1
(45) Date of Patent: Oct. 18, 2022

(54) BABY WAGON WITH IMPROVED EASE OF USE

(71) Applicant: BRAN-NEW INTERNATIONAL, Seoul (KR)

(72) Inventor: Yejin Choi, Busan (KR)

(73) Assignee: BRAN-NEW INTERNATIONAL, Seoul (KR)

(*) Notice: Subject to any disclaimer, the term of this patent is extended or adjusted under 35 U.S.C. 154(b) by 0 days.

(21) Appl. No.: 17/580,236

(22) Filed: Jan. 20, 2022

(30) Foreign Application Priority Data

Nov. 15, 2021 (KR) .......................... 10-2021-0156270

(51) Int. Cl.
| | |
|---|---|
| *B62B 7/06* | (2006.01) |
| *B62B 7/10* | (2006.01) |
| *B62B 7/00* | (2006.01) |
| *B62B 9/14* | (2006.01) |
| *B62B 9/10* | (2006.01) |
| *B62B 9/12* | (2006.01) |
| *B62B 9/20* | (2006.01) |

(Continued)

(52) U.S. Cl.
CPC .............. *B62B 7/105* (2013.01); *B62B 3/007* (2013.01); *B62B 5/067* (2013.01); *B62B 7/006* (2013.01); *B62B 7/008* (2013.01); *B62B 7/062* (2013.01); *B62B 7/066* (2013.01); *B62B 9/102* (2013.01); *B62B 9/12* (2013.01); *B62B 9/142* (2013.01); *B62B 9/20* (2013.01); *B62B 9/26* (2013.01)

(58) Field of Classification Search
CPC ........... B62B 3/02; B62B 3/022; B62B 3/007; B62B 7/06; B62B 7/066; B62B 7/062; B62B 7/064; B62B 7/08; B62B 7/10; B62B 7/105; B62B 9/26; B62B 9/142

USPC ................................................... 297/184.17
See application file for complete search history.

(56) References Cited

U.S. PATENT DOCUMENTS

| | | | |
|---|---|---|---|
| 2,427,964 | A | 9/1947 | Hansburg |
| 4,272,100 | A | 6/1981 | Kassai |

(Continued)

FOREIGN PATENT DOCUMENTS

| | | | |
|---|---|---|---|
| CN | 108482467 A | * | 9/2018 |
| JP | 2009-073479 A | | 4/2009 |

(Continued)

OTHER PUBLICATIONS

Baby Trend Expedition 2-in-1 Stroller Wagon Plus; webpage retrieved May 21, 21; https://www.amazon.com/Baby-Trend-Expedition-Stroller-Marine/dp/B085291NZJ/ref=sr_1_19?dchild=1&keywords=car%2Bstroller%2Bwagon&qid=1621626927&sr=8-19&th=1.

*Primary Examiner* — Emma K Frick
(74) *Attorney, Agent, or Firm* — Novick, Kim & Lee PLLC; Jae Youn Kim

(57) ABSTRACT

A baby wagon with improved ease of use has a folding structure which is stably configured, and thus damages to frames, such as twisting or bending of the frames, can be prevented, such that the baby wagon is stably folded and unfolded, the use of the baby wagon is convenient while durability of the baby wagon is excellent, and comfort of a baby can be maintained even when the baby is in the baby wagon for a long time. The frames are manufactured so as to be easily folded even in the state in which the canopy is coupled thereto, whereby the baby wagon is unfolded and folded within a short time, such that that portability and mobility of the baby wagon are excellent, and such that detachment and coupling of a canopy and a wheel assembly are easily performed.

10 Claims, 24 Drawing Sheets

(51) Int. Cl.
  *B62B 9/26* (2006.01)
  *B62B 3/00* (2006.01)
  *B62B 5/06* (2006.01)

(56) References Cited

U.S. PATENT DOCUMENTS

| | | | |
|---|---|---|---|
| 5,074,575 A * | 12/1991 | Bigo | B62B 7/10 |
| | | | 280/647 |
| 5,184,835 A | 2/1993 | Huang | |
| 5,417,449 A | 5/1995 | Shamie | |
| 5,893,577 A | 4/1999 | Takahashi | |
| 5,979,928 A * | 11/1999 | Kuo | B62B 9/20 |
| | | | 280/648 |
| 6,086,087 A | 7/2000 | Yang | |
| 6,139,046 A | 10/2000 | Aalund et al. | |
| 6,189,914 B1 | 2/2001 | Worth et al. | |
| 6,260,566 B1 | 7/2001 | Lafave et al. | |
| 6,267,404 B1 | 7/2001 | Yang et al. | |
| 6,267,406 B1 | 7/2001 | Huang | |
| 6,454,340 B1 | 9/2002 | Miller | |
| 6,478,503 B1 | 11/2002 | Cheng | |
| 6,698,773 B2 | 3/2004 | Hsia | |
| 6,802,514 B2 | 10/2004 | Worth et al. | |
| 6,843,498 B2 | 1/2005 | Bretschger et al. | |
| 7,017,922 B2 | 3/2006 | Hartenstine et al. | |
| 7,090,239 B2 | 8/2006 | Yoshie et al. | |
| 7,118,173 B2 * | 10/2006 | Kassai | B62B 9/14 |
| | | | 135/133 |
| 7,413,213 B2 | 8/2008 | Pike et al. | |
| 7,487,977 B2 * | 2/2009 | Johnson | B62B 7/04 |
| | | | 280/47.38 |
| 7,500,692 B2 | 3/2009 | Espenshade | |
| 7,523,955 B2 | 4/2009 | Blair | |
| 7,562,895 B2 * | 7/2009 | Santamaria | B62B 7/10 |
| | | | 280/642 |
| 7,631,887 B2 | 12/2009 | Yoshie et al. | |
| 7,938,433 B2 | 5/2011 | Pike et al. | |
| 7,942,437 B2 | 5/2011 | Moore | |
| 7,963,530 B1 | 6/2011 | Garcia | |
| 8,042,828 B2 * | 10/2011 | Ageneau | B62B 7/068 |
| | | | 280/642 |
| 8,186,705 B2 | 5/2012 | Greger et al. | |
| 8,366,139 B2 | 2/2013 | Kane | |
| 8,424,900 B2 | 4/2013 | Ryan et al. | |
| 8,480,115 B2 | 7/2013 | Chen et al. | |
| 8,567,866 B2 | 10/2013 | Carimati Di Carimate et al. | |
| 8,602,441 B2 | 12/2013 | Li | |
| 8,733,787 B2 | 5/2014 | Wang | |
| 8,833,794 B2 | 9/2014 | Yi | |
| 8,888,124 B2 | 11/2014 | Iftinca | |
| 8,973,940 B2 | 3/2015 | Chen | |
| 9,085,311 B1 | 7/2015 | Chen | |
| 9,096,252 B2 | 8/2015 | Thomas et al. | |
| 9,108,656 B1 * | 8/2015 | Nolan | B62B 3/007 |
| 9,139,215 B2 * | 9/2015 | Zhu | B62B 9/12 |
| 9,145,154 B1 | 9/2015 | Horowitz | |
| 9,221,487 B2 * | 12/2015 | Doucette | B62B 7/00 |
| 9,283,978 B2 | 3/2016 | Kikui | |
| 9,302,694 B2 * | 4/2016 | Velichko | A47D 13/068 |
| 9,428,208 B1 | 8/2016 | Chen | |
| 9,452,769 B1 | 9/2016 | Williams et al. | |
| 9,469,324 B2 * | 10/2016 | Bowman | B62B 3/022 |
| 9,511,789 B2 | 12/2016 | Cheng et al. | |
| 9,534,628 B1 | 1/2017 | Wang | |
| 9,545,941 B2 | 1/2017 | Pacella et al. | |
| 9,580,095 B2 | 2/2017 | Vargas, II | |
| 9,650,063 B2 | 5/2017 | Hawk et al. | |
| 9,815,355 B2 | 11/2017 | Byrne et al. | |
| 9,962,011 B1 | 5/2018 | Eyman | |
| 9,981,679 B2 | 5/2018 | Baron | |
| 10,053,131 B2 * | 8/2018 | Ruggiero | B62B 7/006 |
| 10,077,063 B2 * | 9/2018 | Haut | B62B 9/26 |
| 10,150,496 B2 | 12/2018 | Oakes | |
| 10,239,550 B2 * | 3/2019 | Ruggiero | B62B 7/105 |
| 10,343,704 B2 * | 7/2019 | Oakes | B62B 7/062 |
| 10,414,422 B2 | 9/2019 | Choi | |
| 10,464,588 B1 | 11/2019 | Lin | |
| 10,517,265 B2 * | 12/2019 | Lin | B62B 3/02 |
| 10,562,556 B1 * | 2/2020 | Horowitz | B62B 5/064 |
| 10,829,141 B2 | 11/2020 | Lin | |
| 10,843,719 B2 * | 11/2020 | Lelaure | B62B 7/062 |
| 10,850,760 B2 * | 12/2020 | Shapiro | B62B 7/10 |
| 10,875,563 B2 | 12/2020 | Heckler et al. | |
| 10,913,478 B1 * | 2/2021 | Zhou | B62B 7/105 |
| 10,913,481 B2 * | 2/2021 | Kim | B62B 7/06 |
| 10,940,880 B2 | 3/2021 | Haut et al. | |
| 10,946,885 B2 * | 3/2021 | Xiang | B62B 9/14 |
| 10,974,754 B2 | 4/2021 | Choi | |
| 10,988,153 B1 * | 4/2021 | Horowitz | B62B 7/008 |
| 10,994,764 B2 | 5/2021 | Yang | |
| 11,001,289 B2 * | 5/2021 | Gibson | B62B 7/008 |
| 11,008,035 B1 | 5/2021 | Walker | |
| 11,052,933 B2 | 7/2021 | Cheng | |
| 11,097,761 B2 * | 8/2021 | Kim | B62B 9/14 |
| 11,370,467 B1 * | 6/2022 | Horowitz | B62B 5/067 |
| 2002/0109321 A1 | 8/2002 | Turner et al. | |
| 2007/0182198 A1 | 8/2007 | Michelau et al. | |
| 2008/0258435 A1 | 10/2008 | Blair | |
| 2009/0033065 A1 | 2/2009 | Kassai et al. | |
| 2009/0295129 A1 * | 12/2009 | Zweideck | B62B 7/06 |
| | | | 280/642 |
| 2010/0090444 A1 | 4/2010 | Chen et al. | |
| 2010/0148473 A1 | 6/2010 | Vieira et al. | |
| 2010/0156069 A1 | 6/2010 | Chen | |
| 2011/0025005 A1 | 2/2011 | Howell | |
| 2011/0248479 A1 * | 10/2011 | Chen | B62B 9/203 |
| | | | 280/658 |
| 2012/0235372 A1 | 9/2012 | Herlitz et al. | |
| 2013/0083003 A1 | 4/2013 | Perez et al. | |
| 2014/0159346 A1 | 6/2014 | Laffan et al. | |
| 2014/0243083 A1 | 8/2014 | Bae et al. | |
| 2015/0035258 A1 | 2/2015 | Chen et al. | |
| 2015/0042056 A1 | 2/2015 | Sparling | |
| 2015/0151771 A1 | 6/2015 | Jin et al. | |
| 2015/0232115 A1 | 8/2015 | Fleming | |
| 2015/0329135 A1 * | 11/2015 | Sun | B62B 9/26 |
| | | | 280/649 |
| 2016/0059876 A1 | 3/2016 | Strauss | |
| 2016/0328827 A1 | 11/2016 | Ilic et al. | |
| 2020/0010107 A1 | 1/2020 | Lin | |
| 2020/0086906 A1 | 3/2020 | Yang | |
| 2020/0385043 A1 * | 12/2020 | Young | B62B 7/10 |
| 2021/0022314 A1 * | 1/2021 | Xiang | B62B 9/12 |
| 2021/0291886 A1 * | 9/2021 | Zehfuss | B62B 9/14 |

FOREIGN PATENT DOCUMENTS

| | | | |
|---|---|---|---|
| JP | 2013-241181 A | 12/2013 | |
| JP | 2015-016818 A | 1/2015 | |
| KR | 20-1988-0000610 Y1 | 3/1988 | |
| KR | 10-1999-0042198 A | 6/1999 | |
| KR | 20-0308908 Y1 | 3/2003 | |
| KR | 10-2012-0030621 A | 3/2012 | |
| KR | 10-1179554 B1 | 9/2012 | |
| KR | 20-0464952 Y1 | 2/2013 | |
| KR | 10-2015-0023262 A | 3/2015 | |
| KR | 20-0476857 Y1 | 4/2015 | |
| KR | 10-1573235 B1 | 12/2015 | |
| KR | 10-1626778 B1 | 6/2016 | |
| KR | 10-2016-0081539 A | 7/2016 | |
| KR | 10-1672853 B1 | 11/2016 | |
| KR | 10-1697545 B1 | 1/2017 | |
| KR | 10-1719132 B1 | 3/2017 | |
| KR | 10-1725020 B1 | 4/2017 | |
| KR | 20-0483642 Y1 | 6/2017 | |
| KR | 200483642 Y1 * | 6/2017 | B62B 7/14 |
| KR | 10-2018-0004630 A | 1/2018 | |
| KR | 10-1826498 B1 | 2/2018 | |
| KR | 10-1834474 B1 | 3/2018 | |
| KR | 10-1867319 B1 | 6/2018 | |
| KR | 10-1894460 B1 | 9/2018 | |
| KR | 10-1894955 B1 | 9/2018 | |
| KR | 10-1995268 B1 | 7/2019 | |
| KR | 10-2012369 B1 | 8/2019 | |

(56) References Cited

FOREIGN PATENT DOCUMENTS

| KR | 10-2095838 B1 | 4/2020 | | |
|----|---|---|---|---|
| KR | 10-2297087 B1 | 9/2021 | | |
| WO | 2016-098671 A1 | 5/2016 | | |
| WO | WO-2019054652 A1 | * 3/2019 | ............ | B62B 7/083 |
| WO | WO-2019164136 A1 | * 8/2019 | ............ | B62B 7/083 |
| WO | WO-2020101113 A1 | * 5/2020 | ............... | B62B 7/06 |
| WO | WO-2020204643 A1 | * 10/2020 | ............. | B62B 7/083 |

* cited by examiner

BABY WAGON WITH IMPROVED EASE OF USE

CROSS-REFERENCE TO RELATED APPLICATIONS

This application claims priority to Korean patent application No. 10-2021-0156270 filed on Nov. 15, 2021, the entire disclosure of which is hereby incorporated by reference.

BACKGROUND OF THE INVENTION

Field of the Invention

The present invention relates to a baby wagon with improved ease of use configured such that a folding structure of frames is simply manufactured, whereby the baby wagon in a stored state is unfolded and folded within a short time, such that the volume of the baby wagon is minimized when the baby wagon is folded and the baby wagon is easily folded and unfolded, whereby the use of the baby wagon is convenient and portability and mobility of the baby wagon are excellent, in that the shape of the baby wagon is changed to the standing chair mode or the leg chair mode depending on the condition of a baby such that the baby can sit or lie down in a comfortable pose, in that one of two canopies is selectively detachably coupled to the baby wagon as needed, in that the baby wagon is easily folded or unfolded without needing to separate the canopy from the baby wagon, whereby it is possible to easily install and store the baby wagon.

Description of the Related Art

A conventional wagon is manufactured such that, when a locking and unlocking button is pushed and frames stored in a folded state are rotated in order to unfold the wagon, at least three or four manipulations are performed due to the structure of a main body frame. Additionally, a separate canopy or storage basket must be installed at the wagon, whereby installation of the wagon is inconvenient and portability and mobility of the wagon are low. When the wagon is folded after use of the wagon is completed, on the other hand, the wagon is not easily folded, whereby a caregiver or an acquaintance that is not familiar with the use of the wagon has difficulty manipulating the wagon in order to install or store the wagon.

Also, in the conventional wagon, the coupling structure of a wheel and a canopy is complicated, whereby the caregiver works a lot in detaching and coupling the wheel and the canopy. In particular, the conventional wagon is manufactured such that the wagon can be folded only in the state in which the canopy is detached from the wagon. As a result, the canopy must be coupled to or detached from the wagon whenever the wagon is used or stored, which is troublesome.

In addition, a baby wagon seat is configured to have a flat structure. As a result, the pose that a baby in the wagon is capable of taking is limited, whereby the baby may continuously toss and turn and may be uncomfortable sitting for a long time.

PRIOR ART DOCUMENT

Patent Document (Patent Document 1) Korean Registered Patent Publication No. 10-2018-0146478 (registered on Jun. 26, 2019)

SUMMARY OF THE INVENTION

The present invention has been made in view of the above problems, and it is an object of the present invention to provide a baby wagon with improved ease of use configured such that the folding structure of the baby wagon is stably configured, whereby damage to frames, such as twisting or bending of the frames, is prevented, such that the baby wagon is stably folded and unfolded, whereby the use of the baby wagon is convenient while durability of the baby wagon is excellent, such that comfort of a baby is maintained even when the baby is in the baby wagon for a long time, such that that the frames are manufactured so as to be easily folded even in the state in which the canopy is coupled thereto, whereby the baby wagon is unfolded and folded within a short time, such that that portability and mobility of the baby wagon are excellent, whereby it is possible to easily install the baby wagon, and such that detachment and coupling of a canopy and a wheel assembly are easily performed, whereby it is possible to easily carry and store the baby wagon.

In accordance with the present invention, the above and other objects can be accomplished by the provision of a baby wagon with improved ease of use, the baby wagon including a main body frame, a wheel assembly, a seat, and a canopy, the baby wagon serving as a baby transport means, wherein the main body frame includes a lower support frame, which is a quadrangular frame configured to support the lower end of the main body frame, the wheel assembly being coupled to one side of the lower end of the lower support frame, an upper support frame, which is a quadrangular frame configured to form the circumference of the upper end of the main body frame, the upper support frame being configured to support the seat, and a side support frame formed at the main body frame in left-right symmetry, the side support frame being axially coupled to the lower support frame and the upper support frame so as to be folded or unfolded through a hinge structure such that the shape of the side support frame is changed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described with reference to the accompanying drawings.

Figure 1:
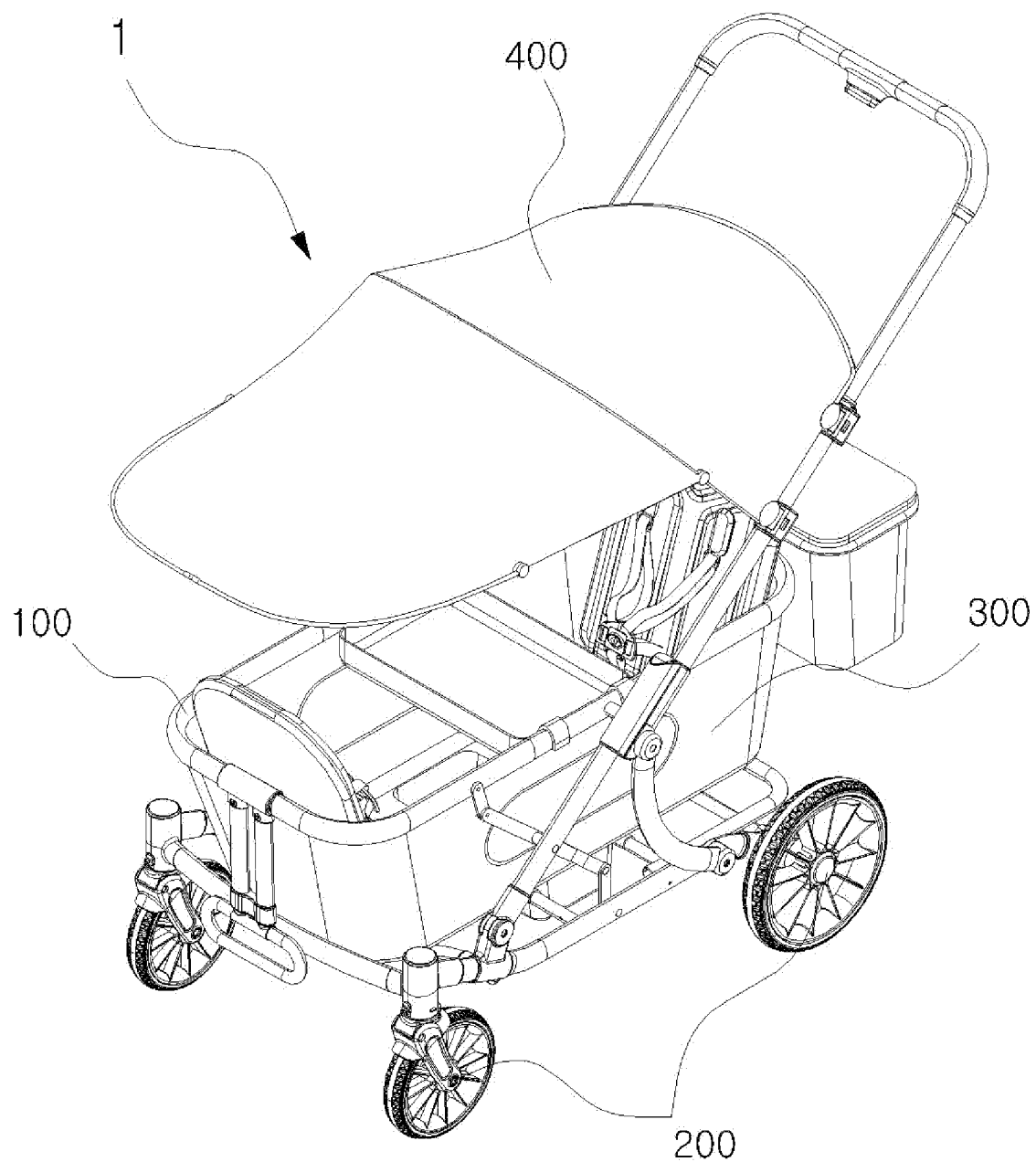
FIG. 1 is a perspective view showing the overall shape of a baby wagon with improved ease of use, to which a wagon canopy according to the present invention is coupled.
Figure 2:
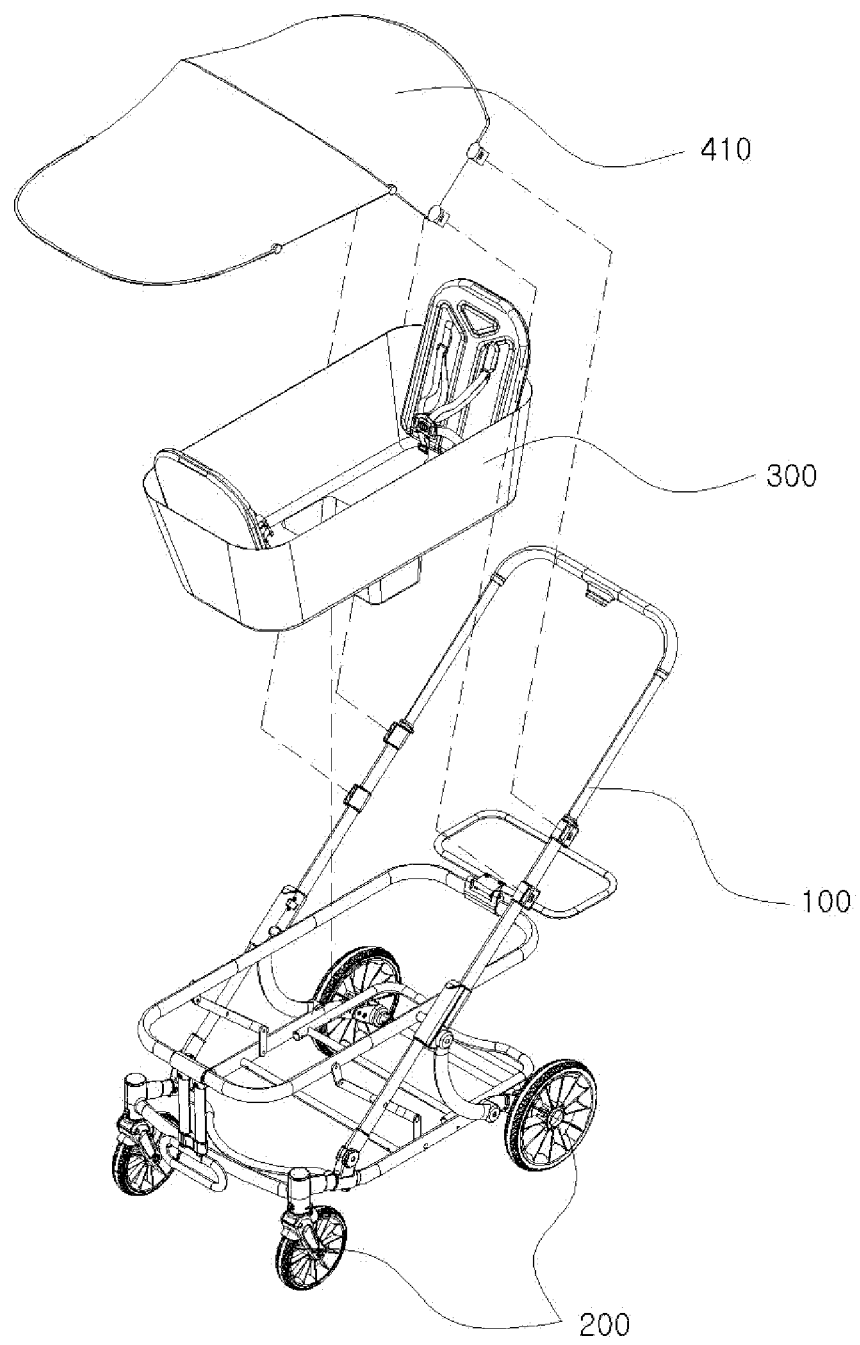
FIG. 2 is an exploded perspective view showing components of the baby wagon with improved ease of use, including the wagon canopy according to the present invention.
Figure 3:
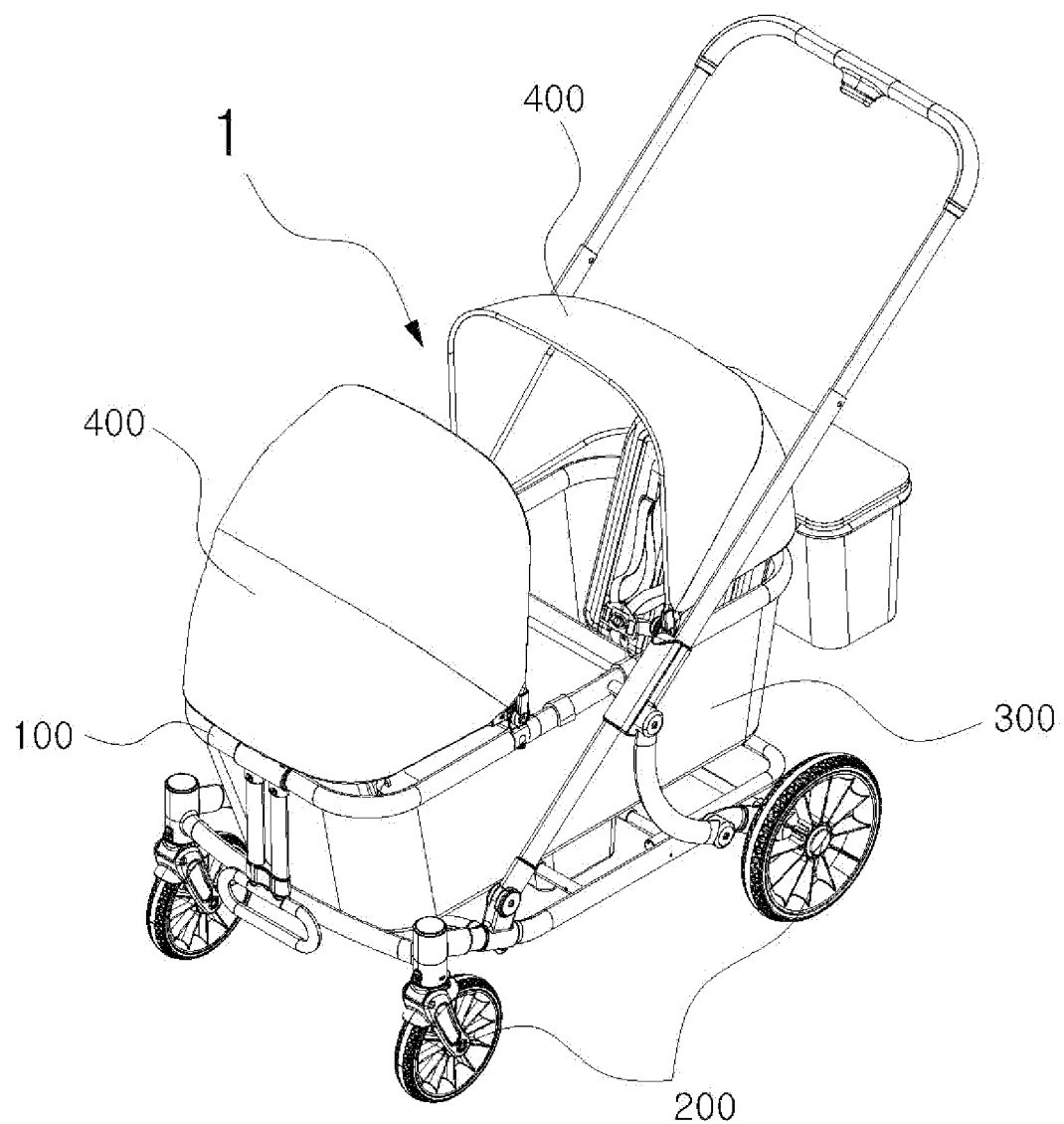
FIG. 3 is a perspective view showing the overall shape of the baby wagon with improved ease of use, to which a baby carriage canopy according to the present invention is coupled.
Figure 4:
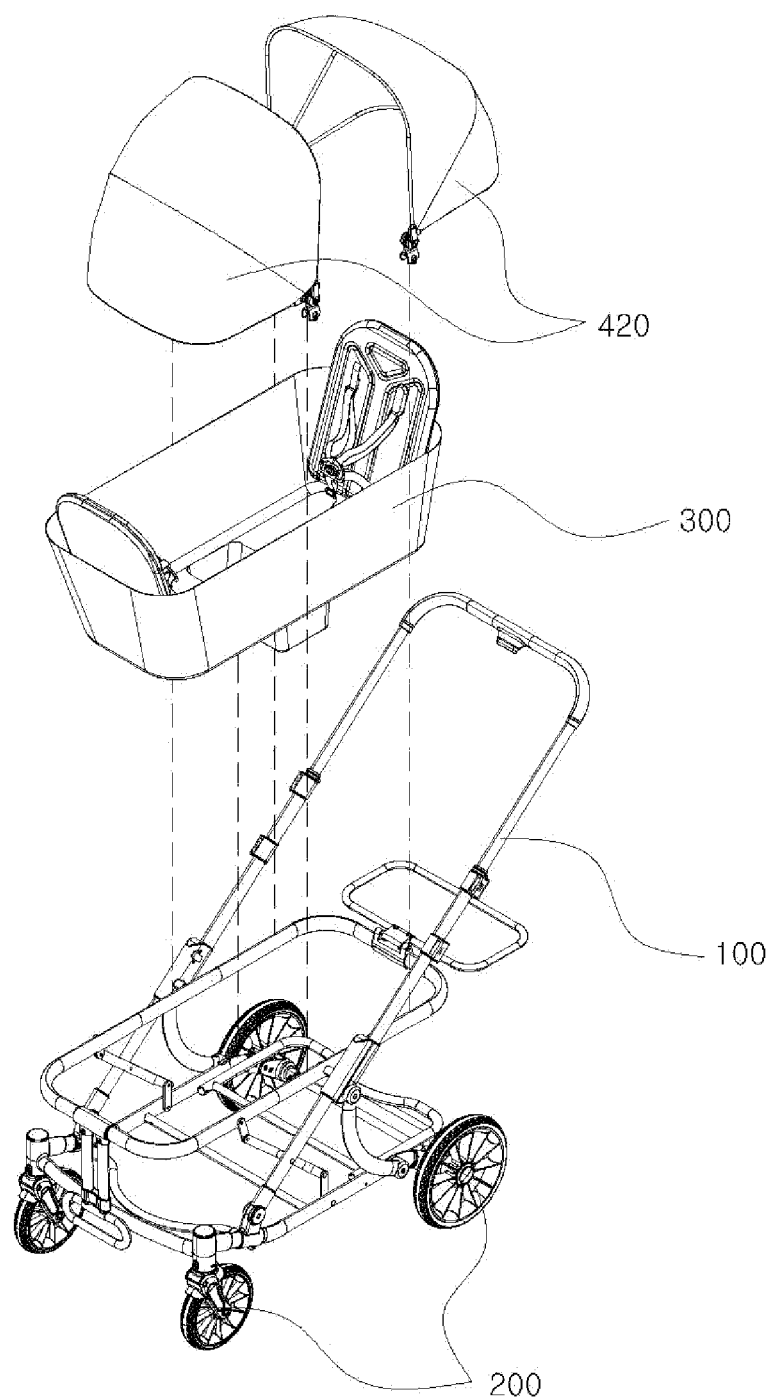
FIG. 4 is an exploded perspective view showing components of the baby wagon with improved ease of use, including the baby carriage canopy according to the present invention.
Figure 5:
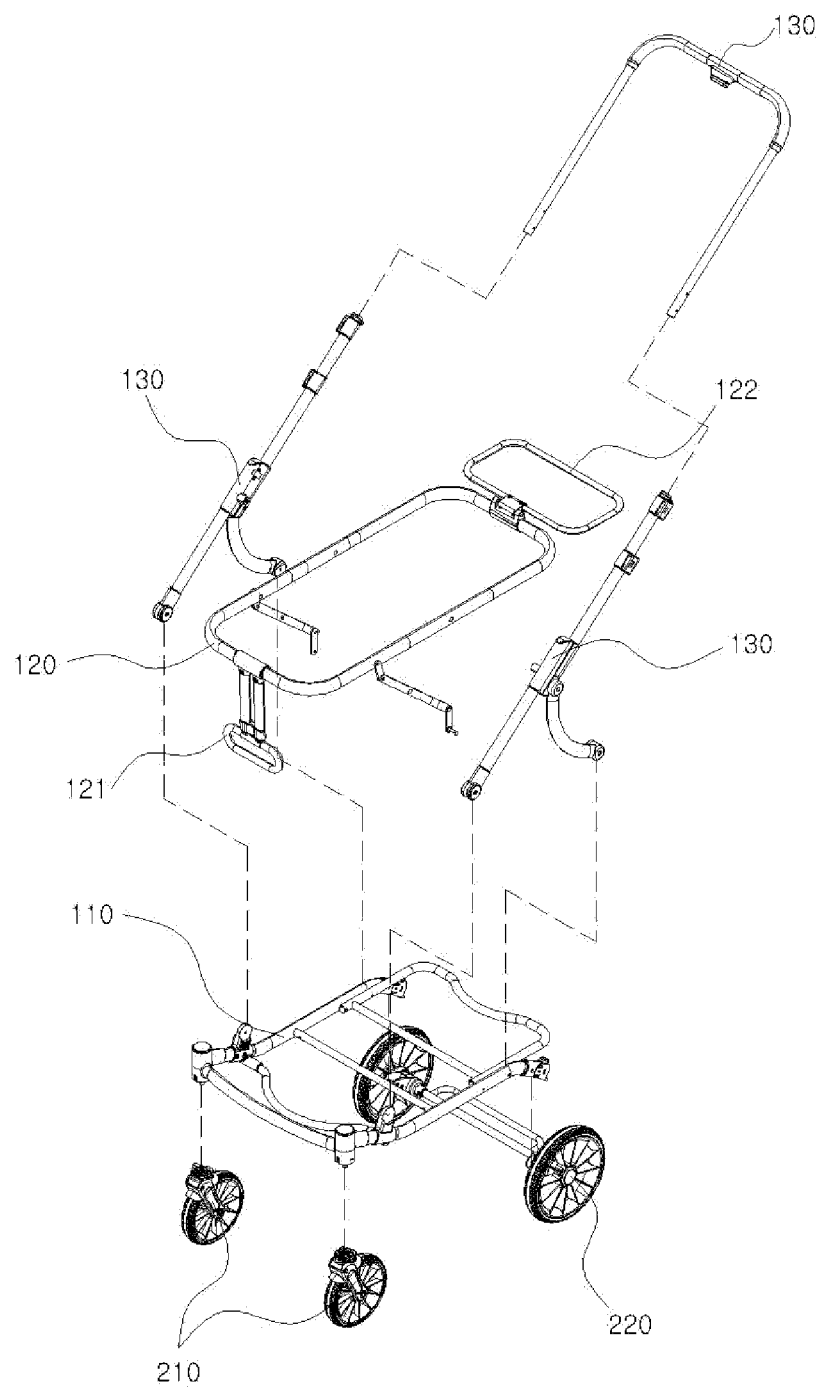
FIG. 5 is an exploded perspective view showing components of a main body frame and a wheel assembly according to the present invention.
Figure 6:
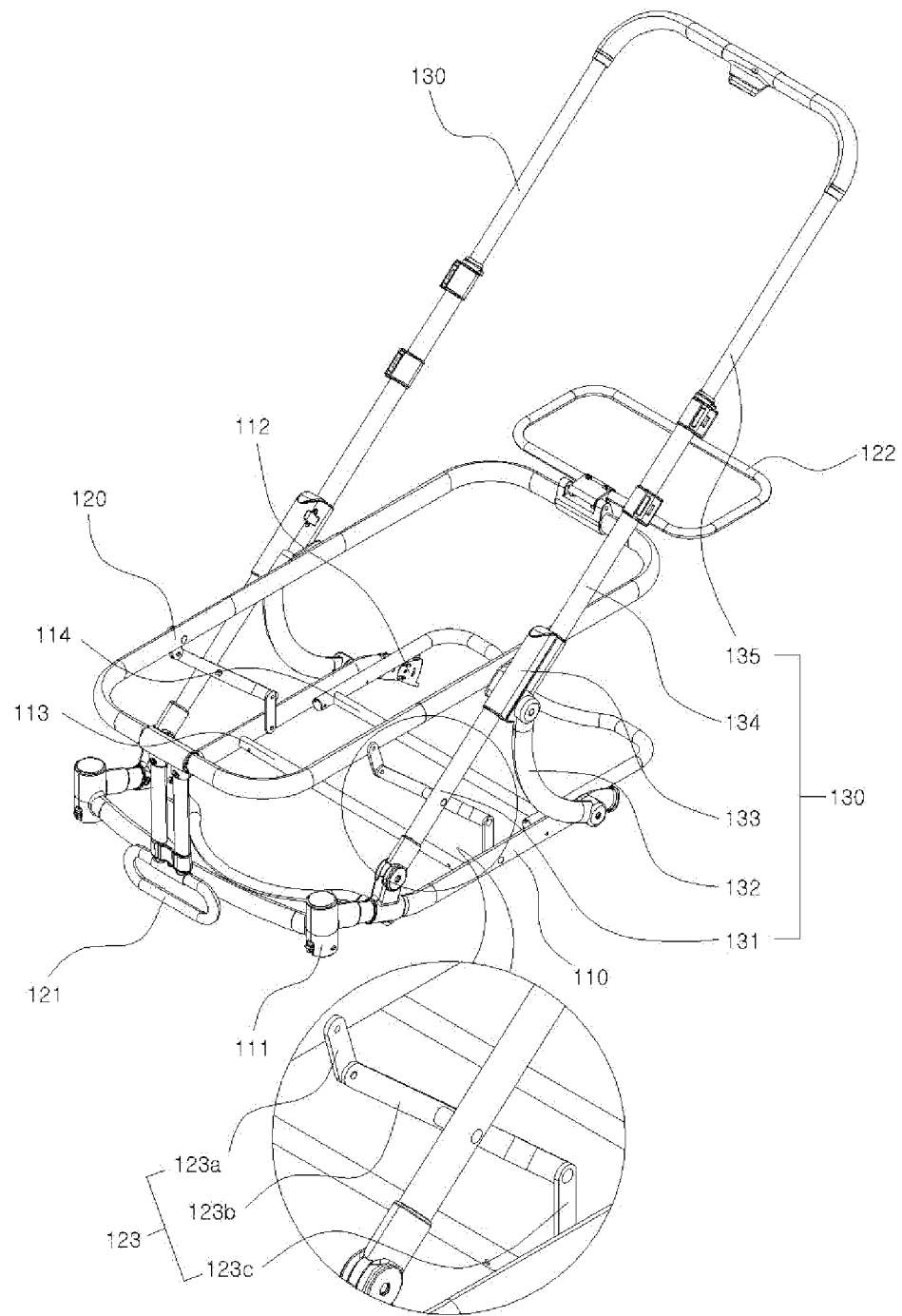
FIG. 6 is a perspective view showing the overall shape of the main body frame according to the present invention.
Figure 7:
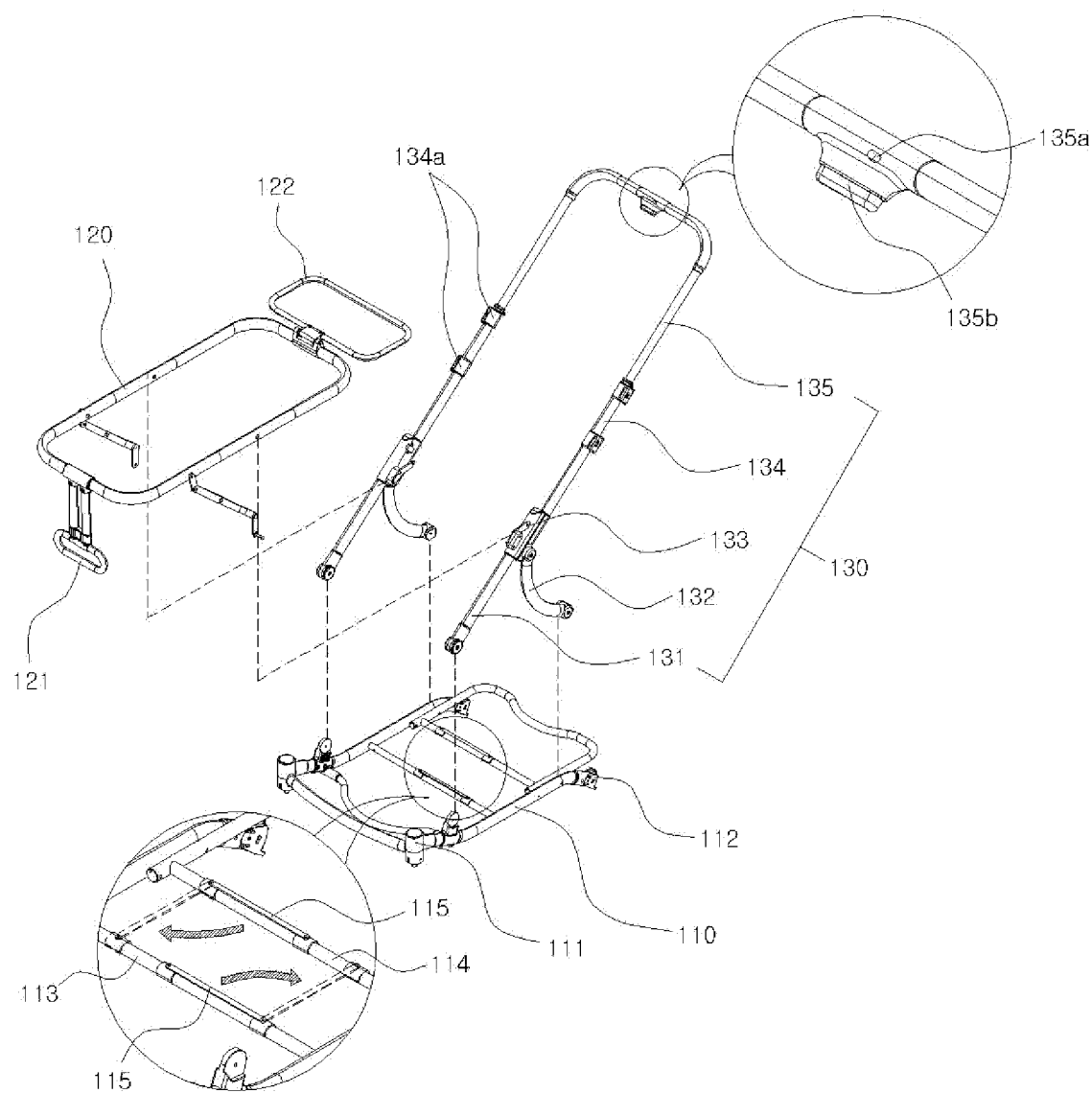
FIG. 7 is an exploded view showing components of the main body frame according to the present invention with an enlarged view showing a portion of the main body frame and a partial enlarged view showing a shape in which a portion of the main body frame is variable.

FIG. 1 is a perspective view showing the overall shape of a wagon with improved ease of use according to the present invention. The wagon includes a main body frame 100, a wheel assembly 200, a seat 300, and a canopy 400.

First, the main body frame 100 according to the present invention will be described.

The main body frame 100 generally supports the body of the wagon and is folded or unfolded through a hinge structure, whereby the shape of the main body frame is changed.

The main body frame includes a lower support frame 110, an upper support frame 120, and a side support frame 130.

The lower support frame 110 is a quadrangular frame configured to support the lower end of the main body frame, and the wheel assembly is coupled to one side of the lower end of the lower support frame. The lower support frame includes a lower side frame, a lower front frame connected with the lower side frame, and a lower rear frame connected with the lower side frame.

The lower support frame includes a front wheel coupling portion 111, a rear wheel coupling portion 112, a front inner frame 113, and a rear inner frame 114.

The front wheel coupling portion 111 is a frame formed at left and right sides of the front of the lower support frame so as to have a symmetrical structure. A front wheel unit is inserted into and fixed to the middle of the lower end surface of the front wheel coupling portion. The front wheel coupling portion includes a rotation prevention switch 111a and a front wheel detachment switch 111b.

Here, the rotation prevention switch 111a is a switch located at the middle of the lower end of the front of the front wheel coupling portion. The rotation prevention switch is provided therein with a rotation prevention pin 111a-1, which is configured to be movable in an upward and downward direction.

When the rotation prevention switch 111a according to the present invention is moved downwards, the rotation prevention pin 111a-1, which is formed in the rotation prevention switch, is inserted into a rotation prevention recess 211a of a front wheel detachment frame, whereby rotation of the front wheel detachment frame in a horizontal direction is prevented, and therefore front wheels are rotated only in a forward direction. When the rotation prevention switch is moved upwards, on the other hand, the rotation prevention pin 111a-1, which is formed in the rotation prevention switch, is separated from the rotation prevention recess 211a of the front wheel detachment frame, whereby rotation of the front wheel detachment frame in the horizontal direction is allowed, and therefore the movement direction of the front wheels can be freely changed when the baby wagon is moved.

In the case in which the front wheels are fixed in the forward direction, therefore, it is possible for a caregiver to easily move the baby wagon without much force when the baby wagon is straightly moved. In the case in which rotation of the front wheel detachment frame in the horizontal direction is allowed, on the other hand, it is possible for the caregiver to move the baby wagon while freely changing the movement direction of the baby wagon.

Here, the front wheel detachment switch 111b is a switch located at the middle of the lower end of the outer surface of the front wheel coupling portion. The front wheel detachment switch is provided therein with a detachment frame recess 111b-1, which is configured to be movable in a leftward and rightward direction.

When the front wheel detachment switch 111b according to the present invention is pushed inwards, the detachment frame recess 111b-1, which is formed in the front wheel detachment switch, is moved inwards, and a detachment recess 211b-1 of a front wheel detachment bar engaged therewith is separated therefrom, whereby the front wheel unit 210 is separated in a downward direction. When the front wheel detachment bar is inserted into a recess formed in the lower end surface of the front wheel coupling portion, on the other hand, the detachment recess 211b-1 is fastened to the detachment frame recess 111b-1, whereby the front wheel unit 210 is fixed.

Since the front wheel unit 210 is detachably coupled to the main body frame, as described above, it is possible to minimize the volume of the baby wagon when the baby wagon is stored. In addition, when a portion of the front wheel unit is damaged, it is possible to replace the damaged portion of the front wheel unit, whereby it is possible to minimize replacement expenses.

The rear wheel coupling portion 112 is a frame formed at left and right sides of the rear of the lower support frame so as to have a symmetrical structure. A bracket inclined rearwards is formed at one side of the lower end of the rear wheel coupling portion. The bracket is coupled to a rear wheel support frame, and is configured to support the upper end of a shock absorbing elastic spring 221b inserted into the rear wheel support frame.

The front inner frame 113 connects left and right sides of the front of the inside of the lower support frame, which has a quadrangular structure, to each other, and serves to support one side of the front of the lower end of the seat 300.

The rear inner frame 114 connects left and right sides of the rear of the inside of the lower support frame, which has a quadrangular structure, to each other, and serves to support one side of the rear of the lower end of the seat 300.

In addition, the lower support frame 110 according to the present invention includes a leg rest support frame 115.

The leg rest support frame 115 connects left and right insides of a quadrangular frame structure laid horizontally to each other, and is detachably coupled perpendicularly to the front inner frame and the rear inner frame, which are supported in parallel to each other in a forward and rearward direction.

The leg rest support frame 115 according to the present invention is configured such that one side of a front frame is axially coupled to the front inner frame and one side of a rear frame is axially coupled to the rear inner frame, and the rotational coupling position of the leg rest support frame is changed based on a leg chair mode, in which the lower end of the seat is flat, or a standing chair mode, in which a standing chair formation portion 320 is formed.

In other words, the reg support frame 115 can include two leg support frames having a first leg support frame and a second leg support frame, such that the front inner frame includes the first leg rest support frame having one end hinge-coupled to the front inner frame, such that the first leg rest support frame is configured to rotate at the one end to be connected with the rear inner frame at another end thereof. Further, the rear inner frame has the second leg rest support frame having one end hinge-coupled to the rear inner frame, such that the second leg rest support frame is configured to rotate at the one end thereof to be connected with the front inner frame at another end thereof.

In the leg chair mode, in which the lower end of the seat is flat, the two leg rest support frames are formed so as to have a right angle structure such that the front inner frame and the rear inner frame are connected to each other through the two leg rest support frames, whereby the lower end of the seat is securely supported. In the standing chair mode, in which the standing chair formation portion is formed, the two leg rest support frames are respectively connected to the front inner frame and the rear inner frame in a horizontal structure, whereby the standing chair formation portion protrudes downwards.

When the lower end of the inside of the seat 300 is changed, therefore, the lower end of the seat may be stably supported or a space in which the standing chair formation portion is formed may be provided, selectively, depending on a changed shape, whereby it is possible to stably support the seat while a baby in the baby wagon takes a comfortable pose.

The upper support frame 120 is a quadrangular frame that forms the circumference of the upper end of the main body frame, and serves to support the seat.

The upper support frame 120 according to the present invention includes a front handle assembly 121, a basket frame 122, and an auxiliary link frame 123.

The front handle assembly 121 is a frame coupled to the middle of the front of the upper support frame through a rotating shaft structure, and a handle is formed at the end of the front handle assembly so as to be rotatably coupled thereto.

Figure 16:
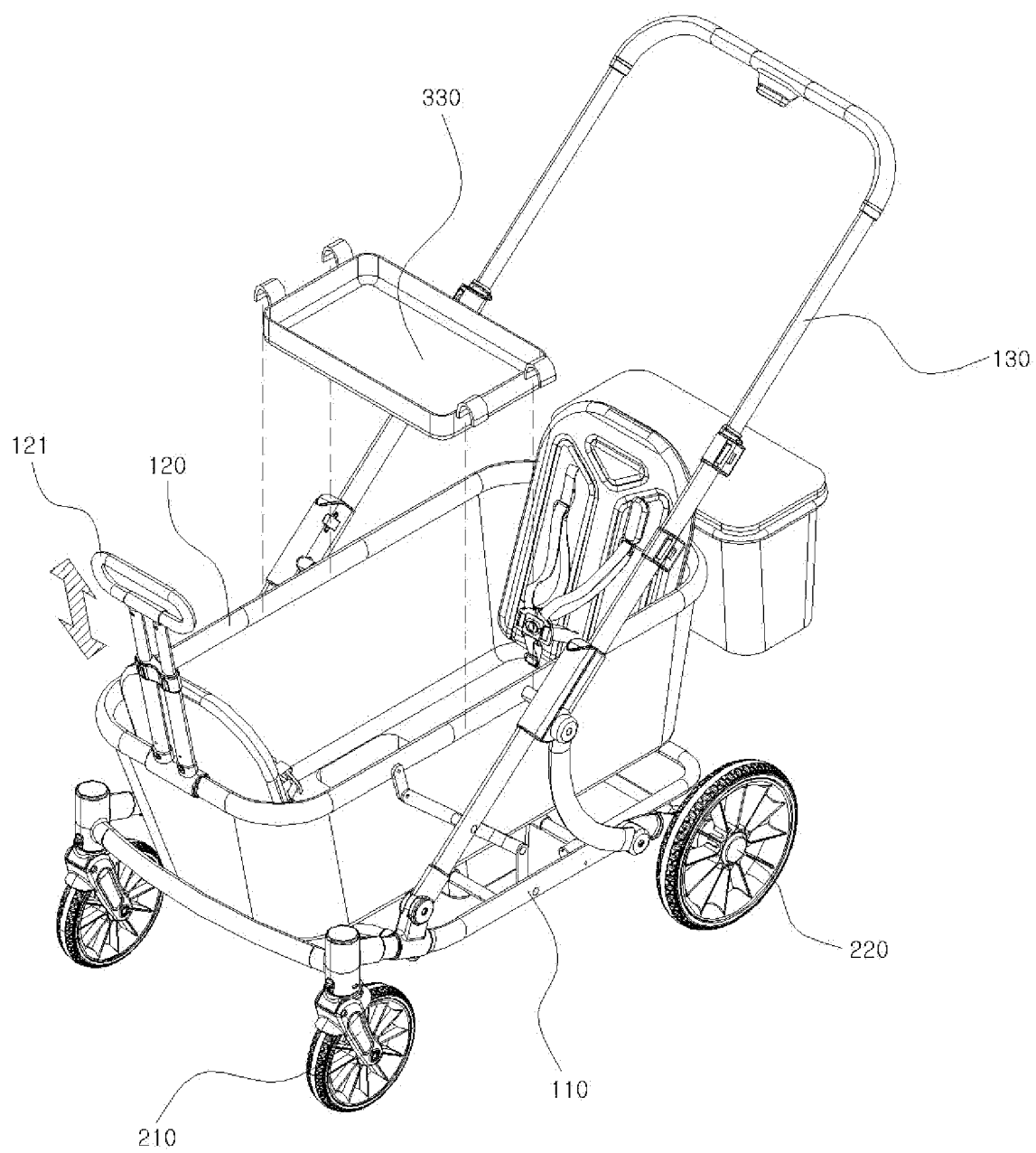
FIG. 16 is an exploded view showing coupling of a tray to one side of the upper end of the main body frame according to the present invention.
Figure 17:
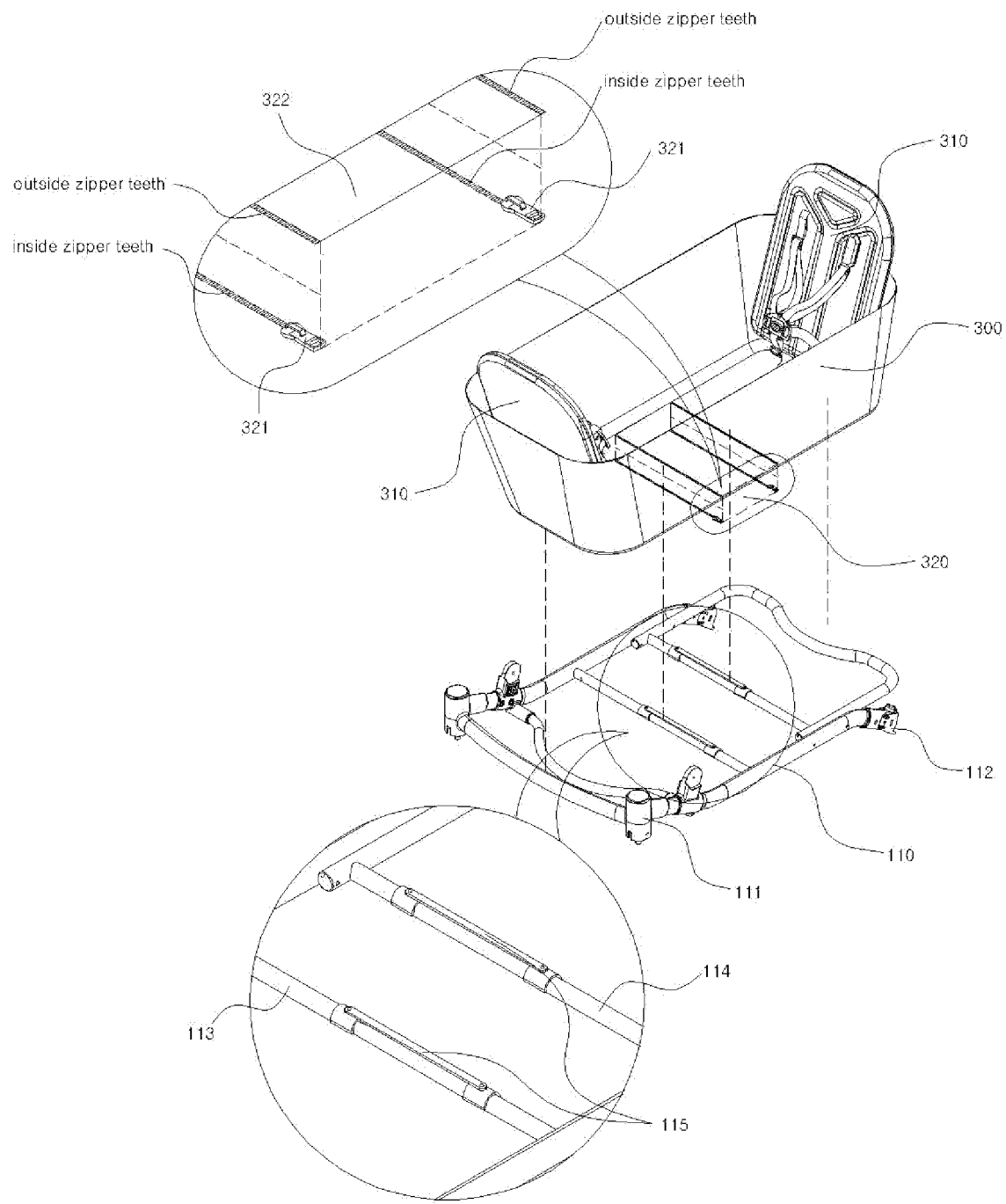
FIG. 17 is an exploded view showing that a leg rest support frame of the lower support frame according to the present invention is coupled to a front inner frame and a rear inner frame so as to be parallel thereto and a standing chair formation portion is provided at the middle of the lower end of a seat.
Figure 18:
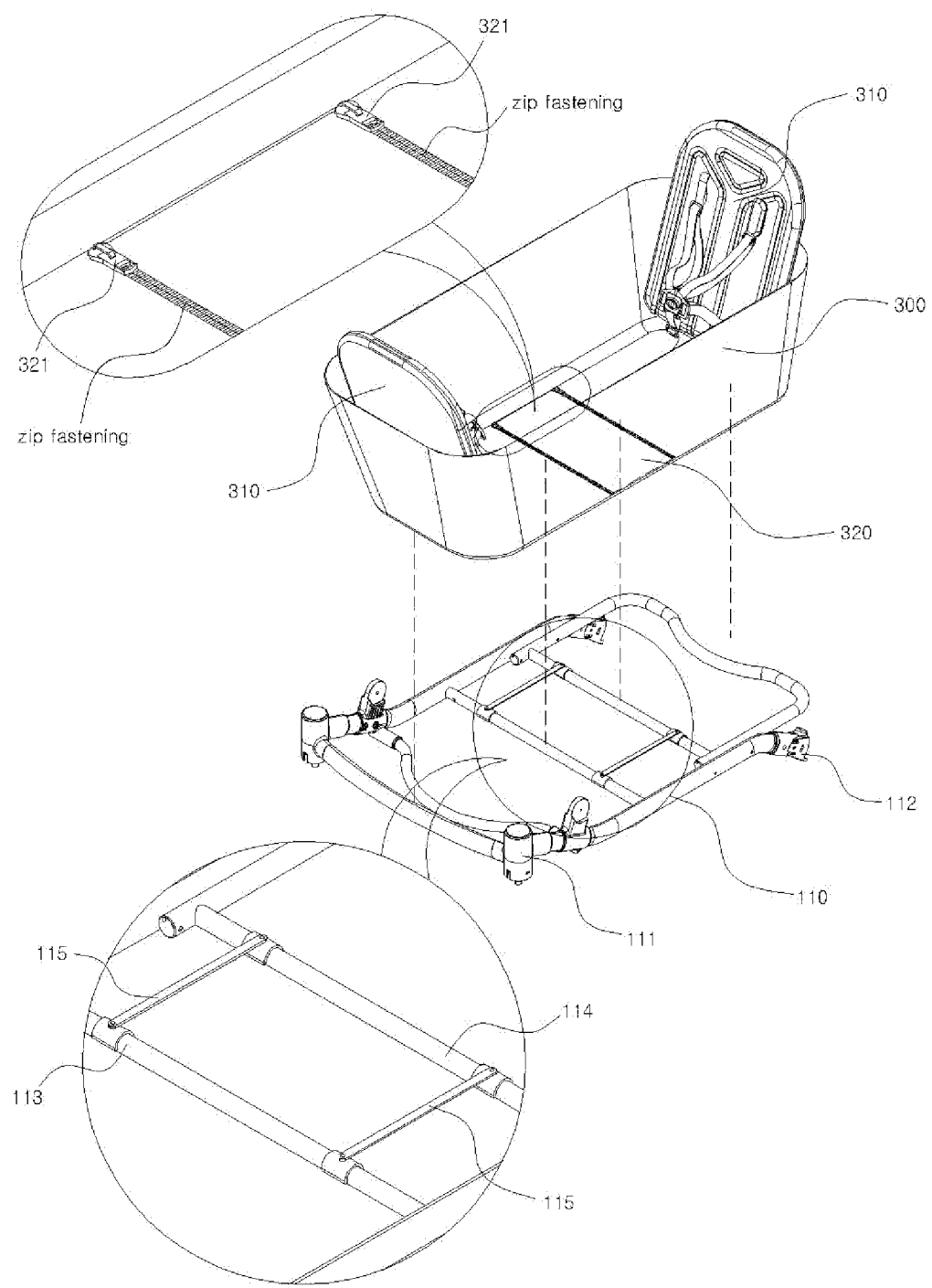
FIG. 18 is an exploded view showing that the leg rest support frame of the lower support frame according to the present invention is coupled to the front inner frame and the rear inner frame so as to be perpendicular thereto and the lower end surface of the seat is flat.
Figure 19:
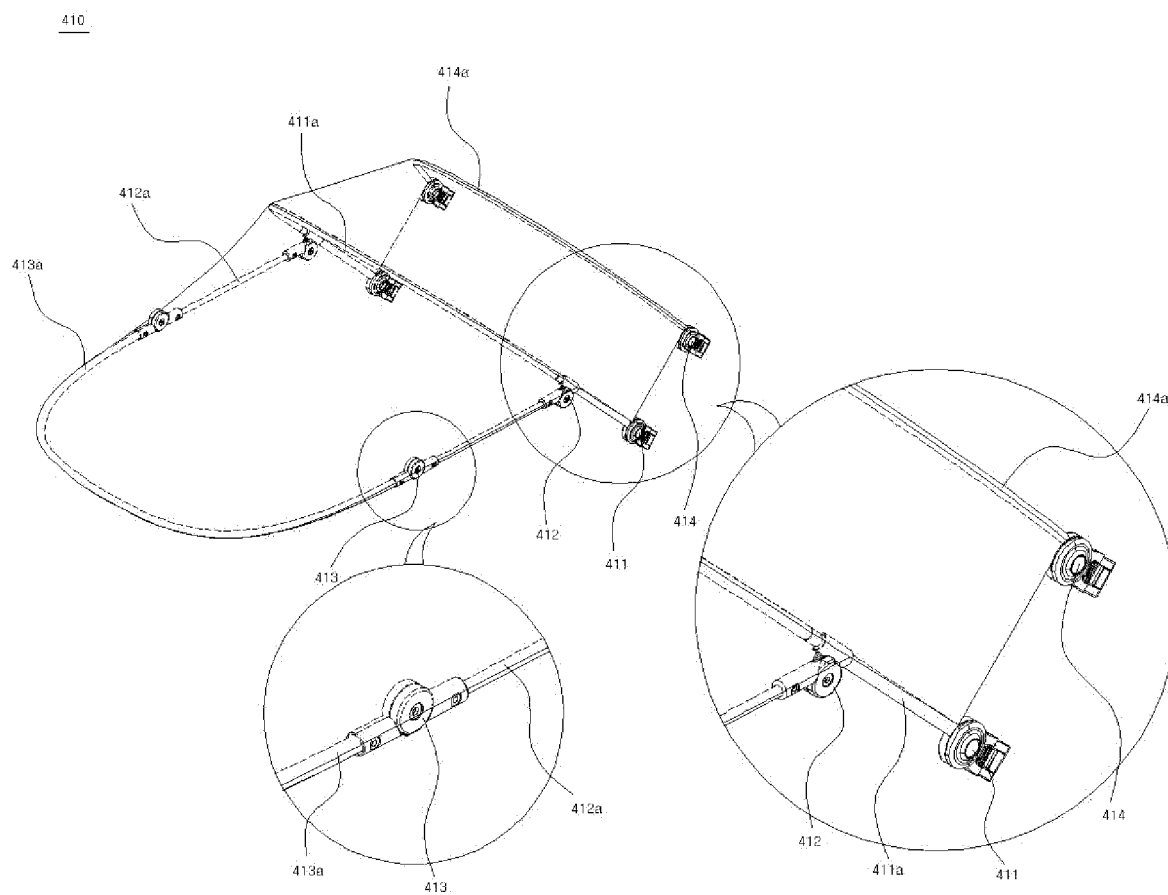
FIG. 19 is a view showing the overall shape of the wagon canopy according to the present invention with a projection view of an inner portion thereof and a partial enlarged view of a portion thereof.
Figure 20:
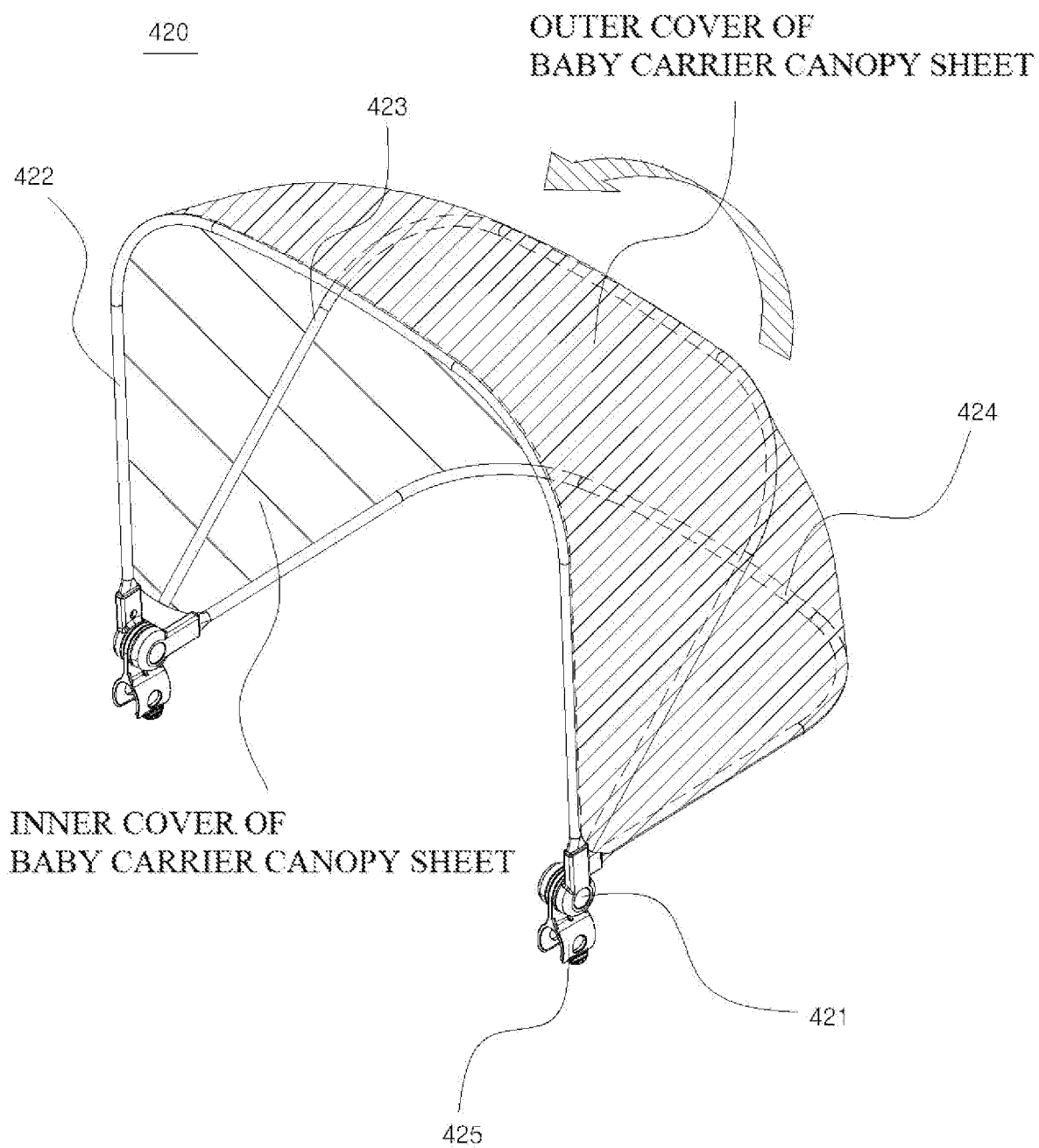
FIG. 20 is a view showing the overall shape of a baby carrier canopy sheet according to the present invention in which an outer cover of the baby carrier canopy sheet is unfolded so as to form an outer surface of the baby carrier canopy sheet and an inner portion thereof is projected.
Figure 21:
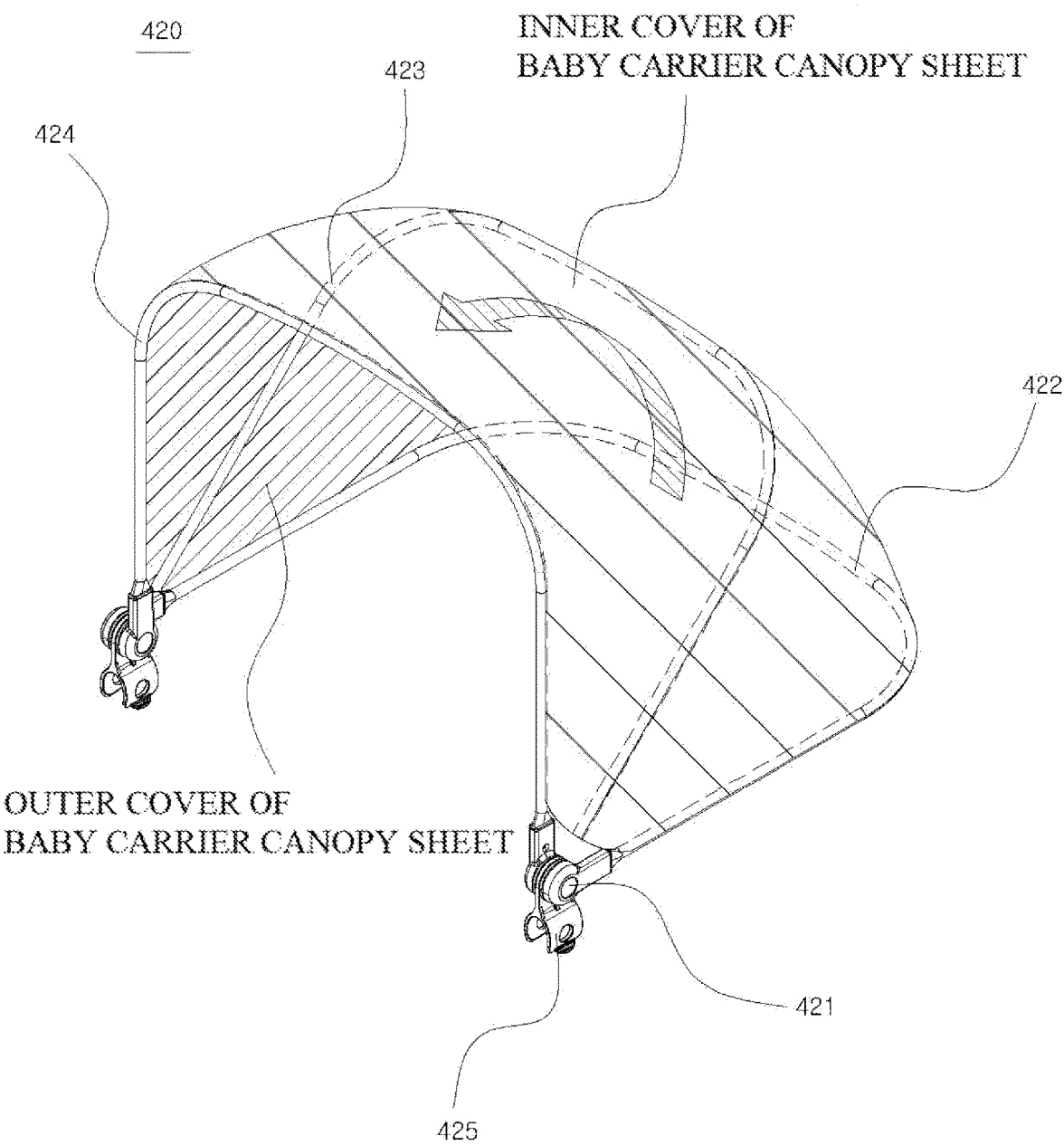
FIG. 21 is a view showing the overall shape of the baby carrier canopy sheet according to the present invention in which an inner cover of the baby carrier canopy sheet is unfolded so as to form the outer surface of the baby carrier canopy sheet and an inner portion thereof is projected.
Figure 22:
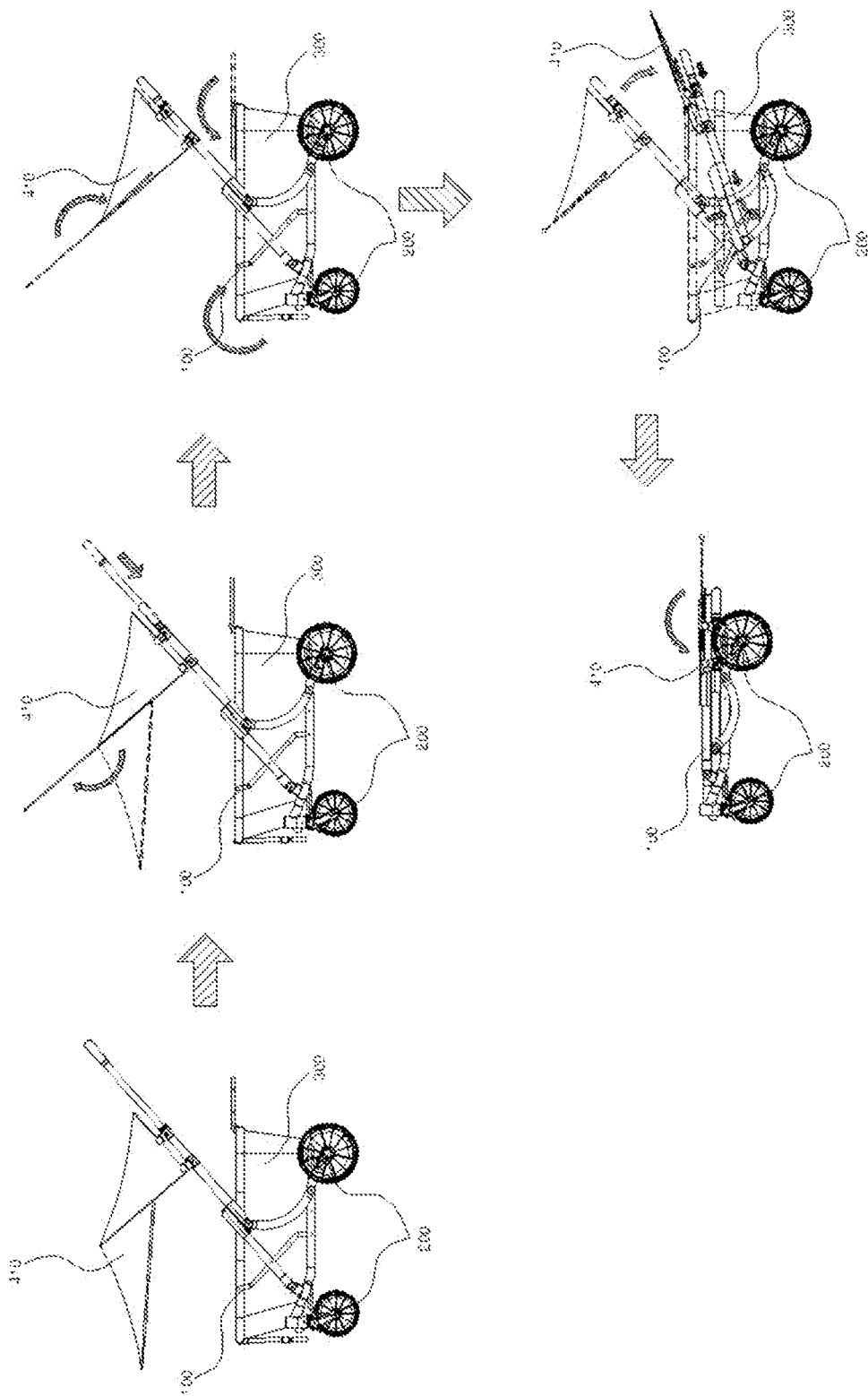
FIG. 22 is a side view showing a state in which the baby wagon having the wagon canopy according to the present invention coupled thereto is sequentially folded.
Figure 23:
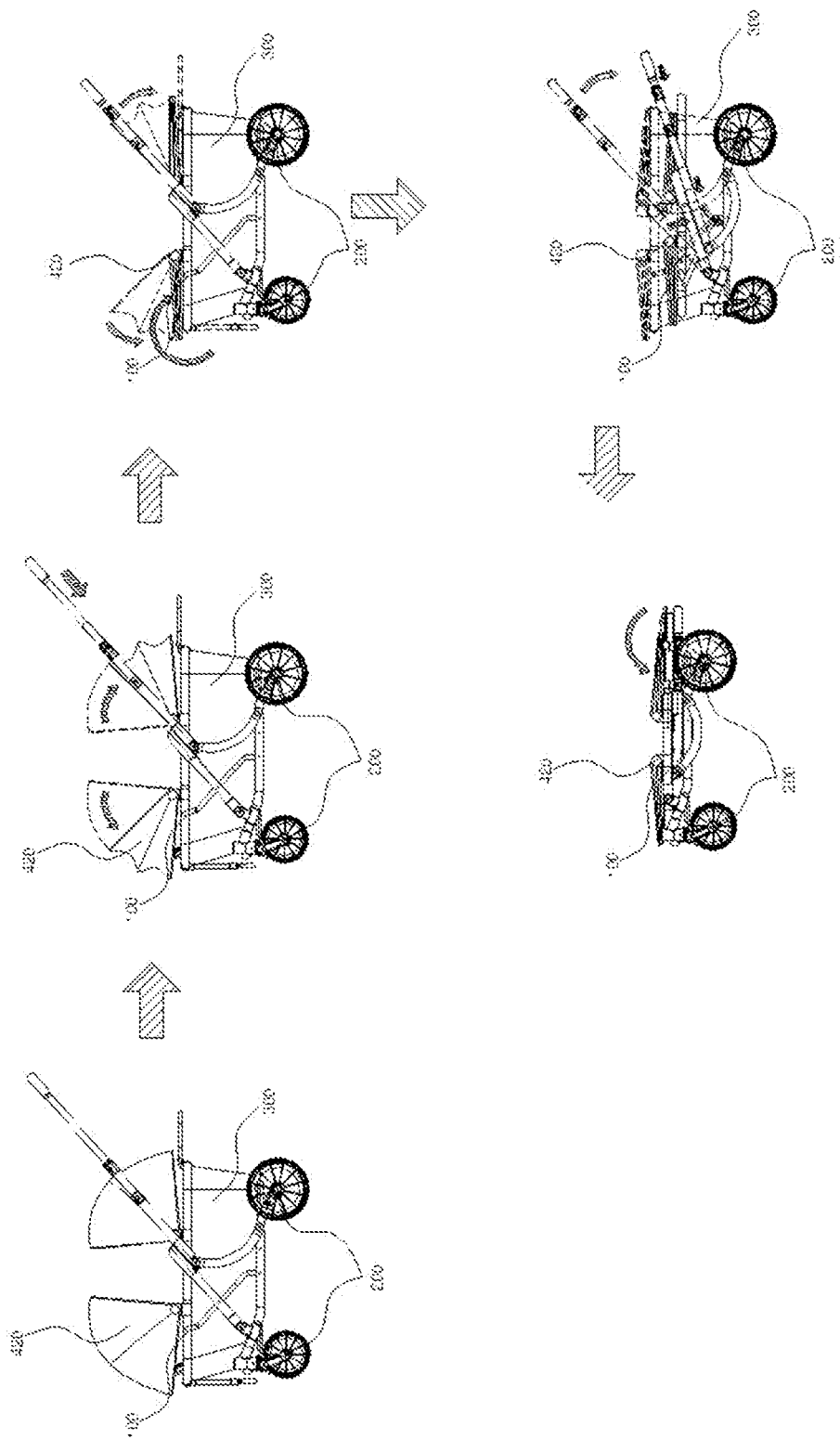
FIG. 23 is a side view showing a state in which the baby wagon having the baby carrier canopy according to the present invention coupled thereto is sequentially folded.
Figure 24:
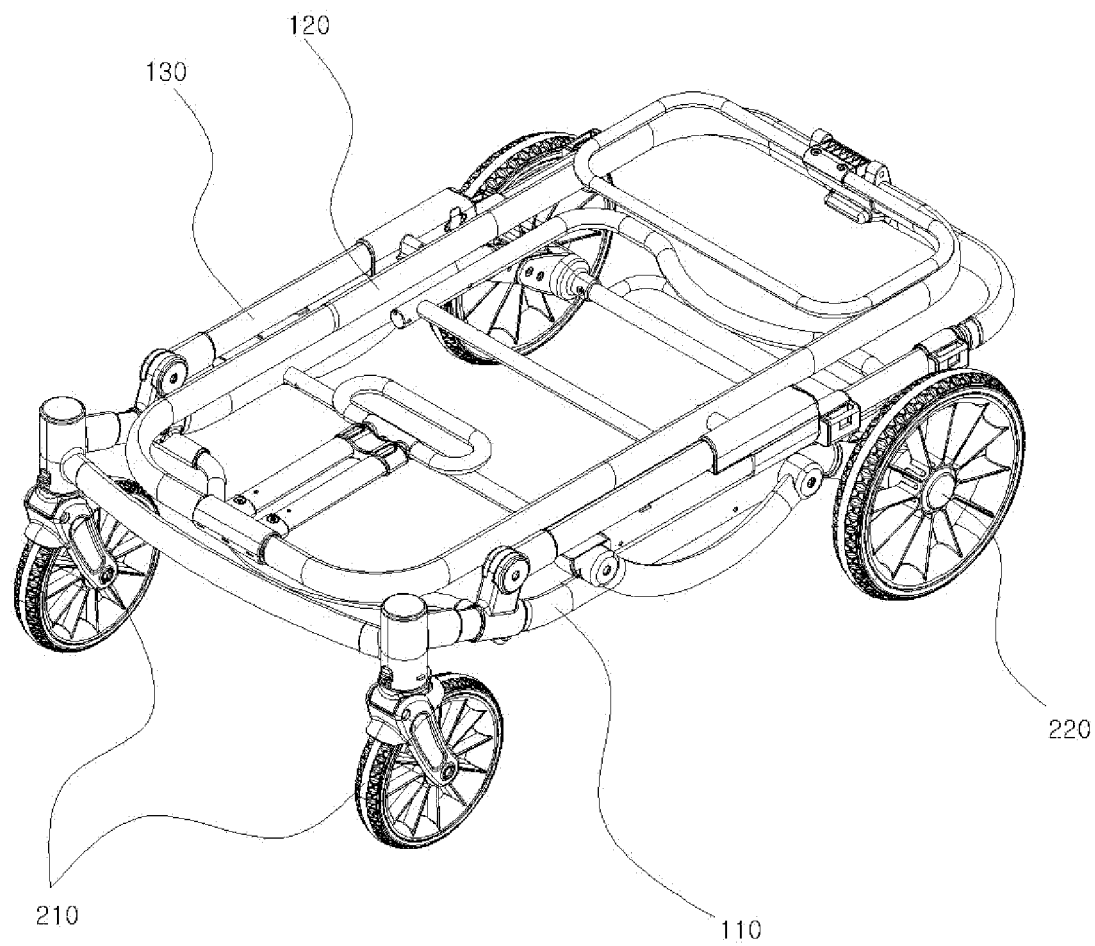
FIG. 24 is a perspective view showing the overall shape of the main body frame and the wheel assembly according to the present invention in which the main body frame and the wheel assembly are folded in a state of being coupled to each other.

As shown in FIG. 16, the front handle portion 121 is configured such that the length of the front handle portion 121 is adjusted, i.e. increased or decreased, in a longitudinal direction of the frame, whereby the length of the handle is variable. When the caregiver is located in front of the baby wagon, therefore, it is possible to stably move the baby wagon.

When the caregiver is located in front of the baby wagon, as described above, it is possible for the caregiver to pull the baby wagon holding the front handle assembly in order to move the baby wagon, and the baby wagon may be smoothly rotated about the rotating shaft, to which the handle is coupled, whereby it is possible to easily change the movement direction of the baby wagon.

The basket frame 122 is a quadrangular frame coupled to the middle of the rear of the upper support frame through a rotating shaft structure, and serves to support a basket sheet having a quadrangular basket bag shape in a vertical direction along the circumference of the frame.

When the basket frame 122 is rotated about the rotating shaft coupled to the upper support frame outwards in a rearward direction, the basket sheet is unfolded vertically at the rear of the main body frame. When the basket frame is rotated about the rotating shaft inwards in the forward direction, the basket sheet is folded in a direction toward the inside of the main body frame, whereby it is possible to minimize the basket sheet from protruding in a direction toward the outside of the main body frame, whereby it is possible to reduce the volume of the basket sheet so as to have a compact size.

The auxiliary link frame 123 is a three-stage link frame formed at left and right sides of one side of the front of the upper support frame so as to have a symmetrical structure, wherein a first link frame 123a located at the upper end is axially coupled to one side of the side surface of the upper support frame, a second link frame 123b located at the middle is axially coupled to one side of the side surface of the side support frame, and a third link frame 123c located at the lower end is axially coupled to one side of the side surface of the lower support frame.

When the main body frame is folded or unfolded, therefore, the first link frame 123a, the second link frame 123b, and the third link frame 123c are simultaneously rotated through a rotating shaft structure, whereby the main body frame is folded or unfolded.

As a result, when the mode of the baby wagon 1 is switched to a folding mode in which the left-right symmetrical portions of the lower support frame 110, the upper support frame 120, and the side support frame 130 of the baby wagon 1 are folded or unfolded through axial coupling therebetween, the main body frame is supported so as to be stably rotated. When the baby wagon 1 is fixed in a usage mode, the main body frame is auxiliarily supported, whereby durability of the baby wagon may be improved.

The side support frame 130 is formed at the main body frame in left-right symmetry, and is axially coupled to the lower support frame and the upper support frame so as to be folded or unfolded through a hinge structure such that the shape of the side support frame is changed.

The side support frame includes a first side frame 131, a second side frame 132, a side locking frame 133, a lower handle frame 134, and an upper handle frame 135.

The first side frame 131 is an inclined frame formed at the front lower end. The lower end of the first side frame is axially coupled to one side of the front of the lower support frame, and the upper end of the first side frame is coupled to the side locking frame.

The first side frame is provided in the lower end thereof with a slide groove 131a extending in a longitudinal direction, and a slide protrusion 134c formed on the upper end surface of one side of the lower end of the lower handle frame 134 is inserted into the slide groove so as to be movable in a state of being parallel thereto in a longitudinal direction.

When the main body frame is folded or unfolded, the lower handle frame is moved relative to the first side frame in a longitudinal direction such that the first side frame and the lower handle frame are parallel to each other in the state in which the distance between the first side frame and the lower handle frame is not changed by the provision of the slide groove 131a.

When the main body frame is folded, therefore, friction is minimized, whereby smooth folding is achieved.

The second side frame 132 is a frame formed at the rear lower end. The lower end of the second side frame is axially coupled to one side of the rear of the lower support frame, and the upper end of the second side frame is axially coupled to the lower handle frame.

The second side frame is fixed to support the main body frame in the state in which the side support frame 130 is unfolded or supports one side of the lower support frame and the lower handle frame when the main body frame is folded, and therefore the second side frame performs a support function such that rotation is smoothly performed at the time of folding or unfolding.

The upper end of the side locking frame 133 is coupled to the first side frame, and the side locking frame 133 is provided in the lower end thereof with a through-hole formed parallel to the first side frame such that one side of the lower handle frame 134 is coupled through the through-hole, whereby movement of the lower handle frame is locked or unlocked.

The side locking frame 133 according to the present invention is provided in one side of the upper end of the inside thereof with a folding locking pin 133a perpendicularly to a longitudinal direction, and a pin spring 133b is formed at the upper end of the folding locking pin.

Here, the folding locking pin 133a is configured to be detachably coupled to a folding locking pin insertion hole 134a formed in one side of the upper end of the lower end part of the lower handle frame.

When the lower handle frame is located at the upper limit of a longitudinal movement range, the position of the folding locking pin 133a coincides with the position of the folding locking pin insertion hole 134a, and the folding locking pin 133a is inserted into the folding locking pin insertion hole 134a due to elasticity of the pin spring 133b, whereby the usage mode of the baby wagon is formed. When the lower handle frame is moved to the lower limit of the longitudinal movement range, the folding locking pin 133a is detached from the folding locking pin insertion hole 134a, whereby the folding mode of the baby wagon is formed.

Figure 8:
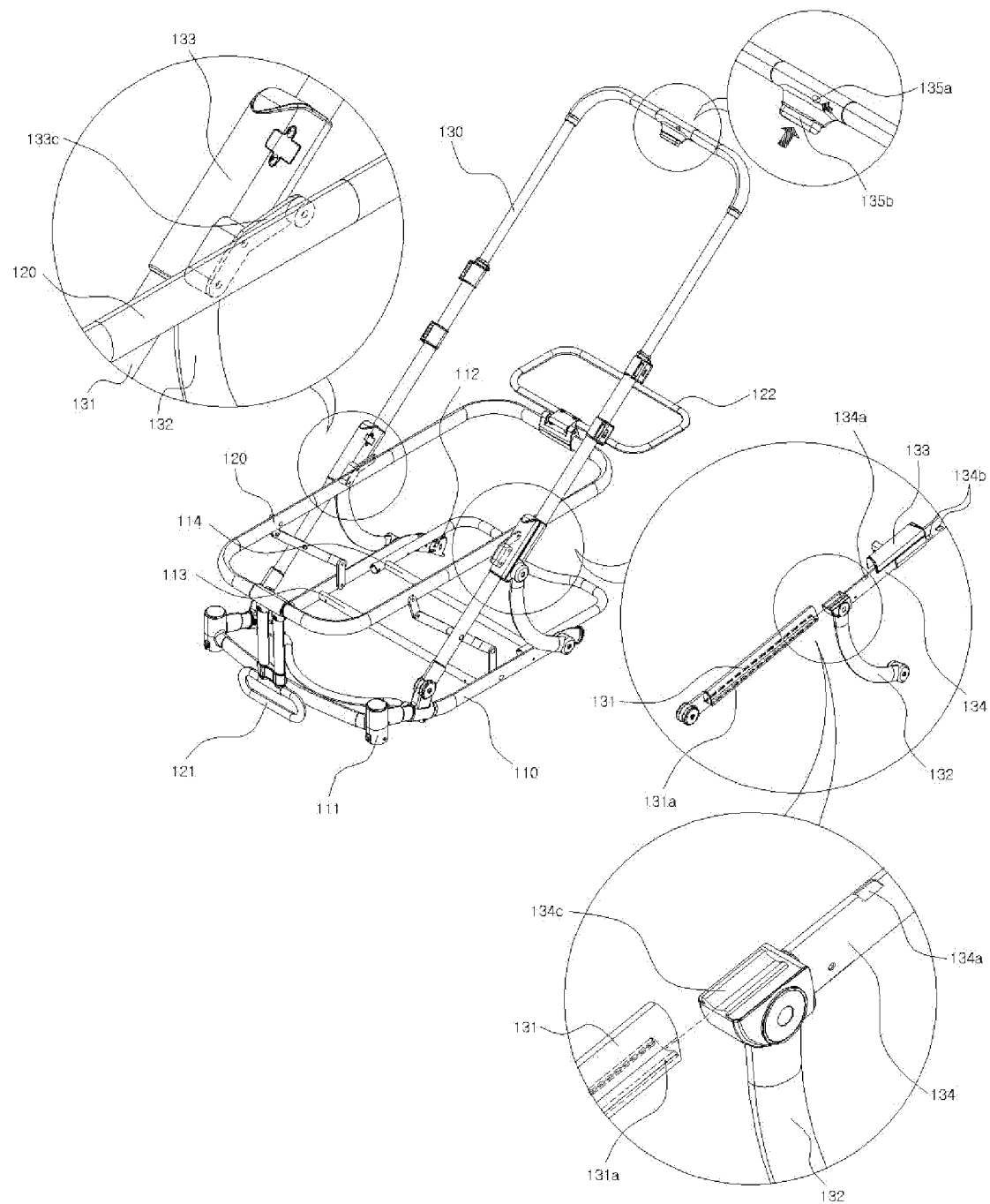
FIG. 8 is a view showing the overall shape of the main body frame according to the present invention with a partial enlarged view showing coupling between components of a side support frame.
Figure 9:
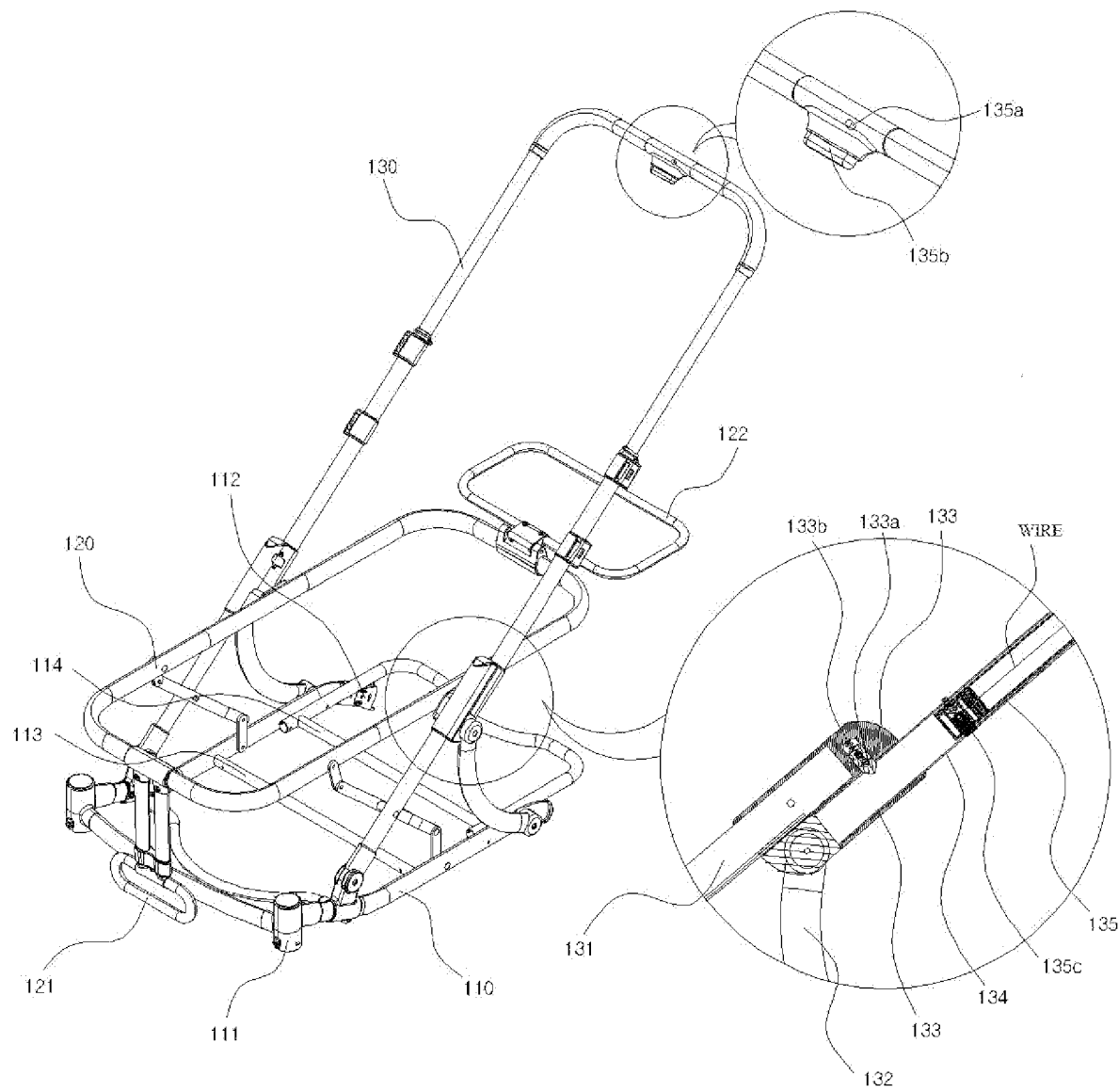
FIG. 9 is a view showing the overall shape of the main body frame according to the present invention with a partial enlarged view showing a portion of the side surface of the side support frame.
Figure 10:
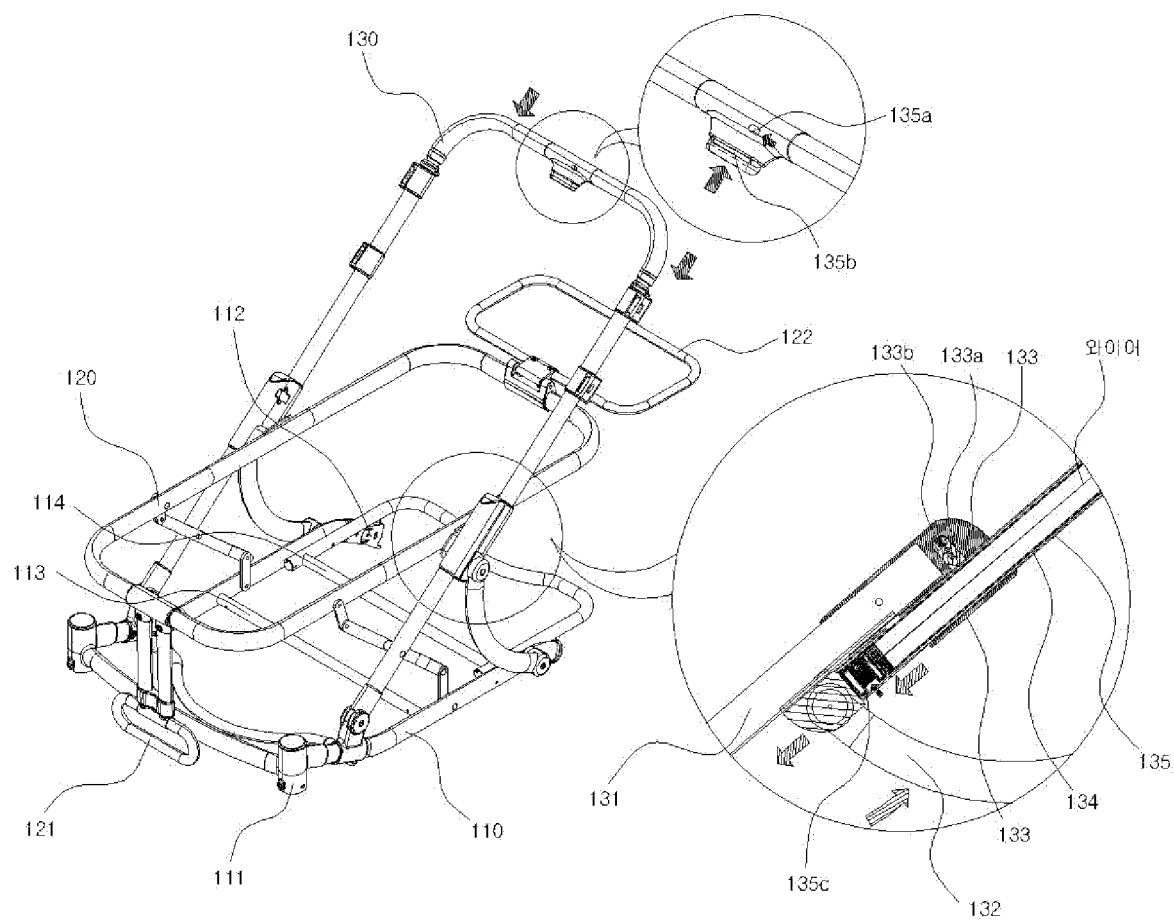
FIG. 10 is a view showing the overall shape of the main body frame according to the present invention with a partial enlarged view showing a state in which a first safety locking button and a second safety locking button of an upper handle frame are released, whereby a length adjustment locking pin is detached, the upper handle frame is inserted into a lower handle frame in a longitudinal direction, a folding locking pin is detached, and folding locking is released.
Figure 11:
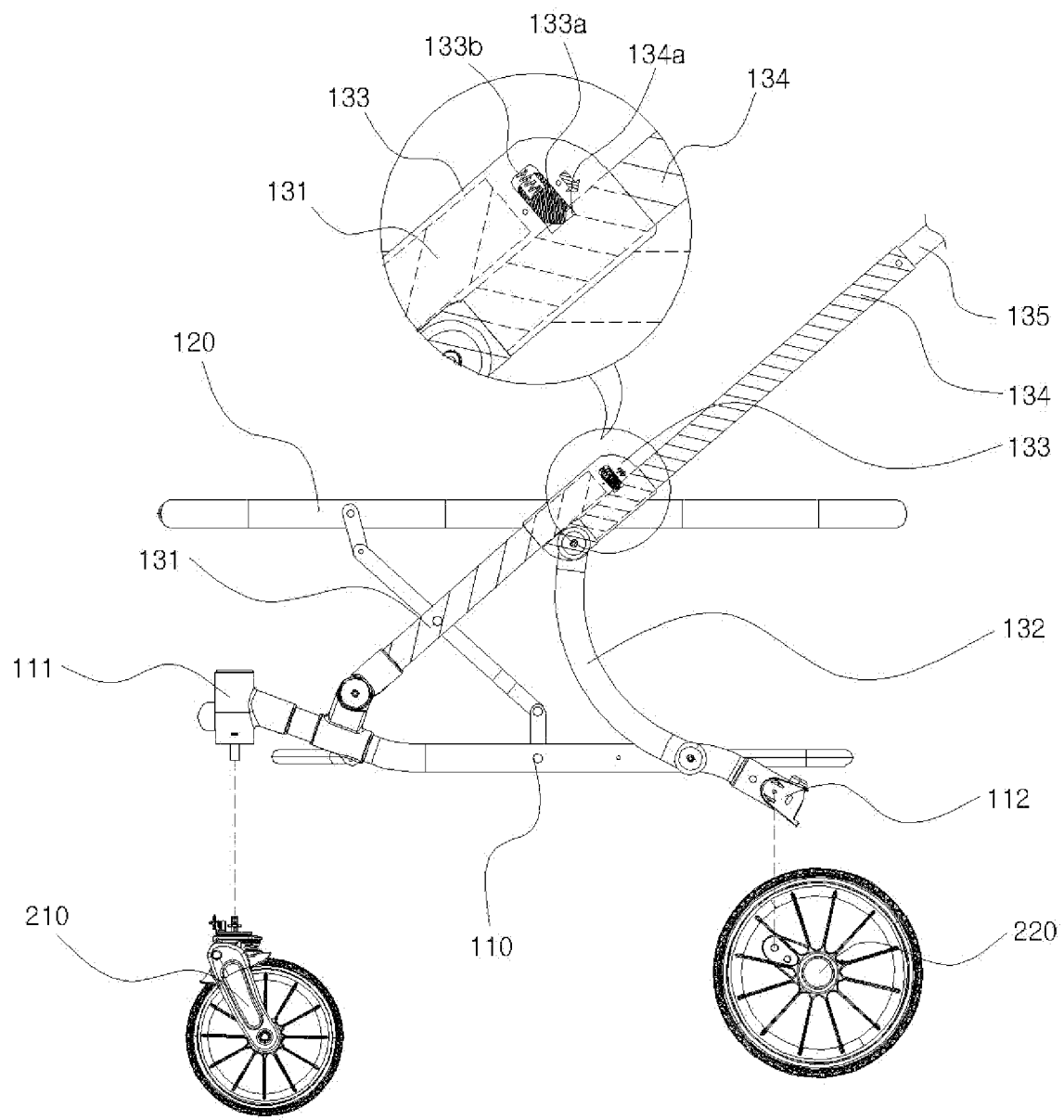
FIG. 11 is a side view showing the main body frame according to the present invention with an enlarged sectional view showing a portion of the internal structure of a side locking frame.
Figure 12:
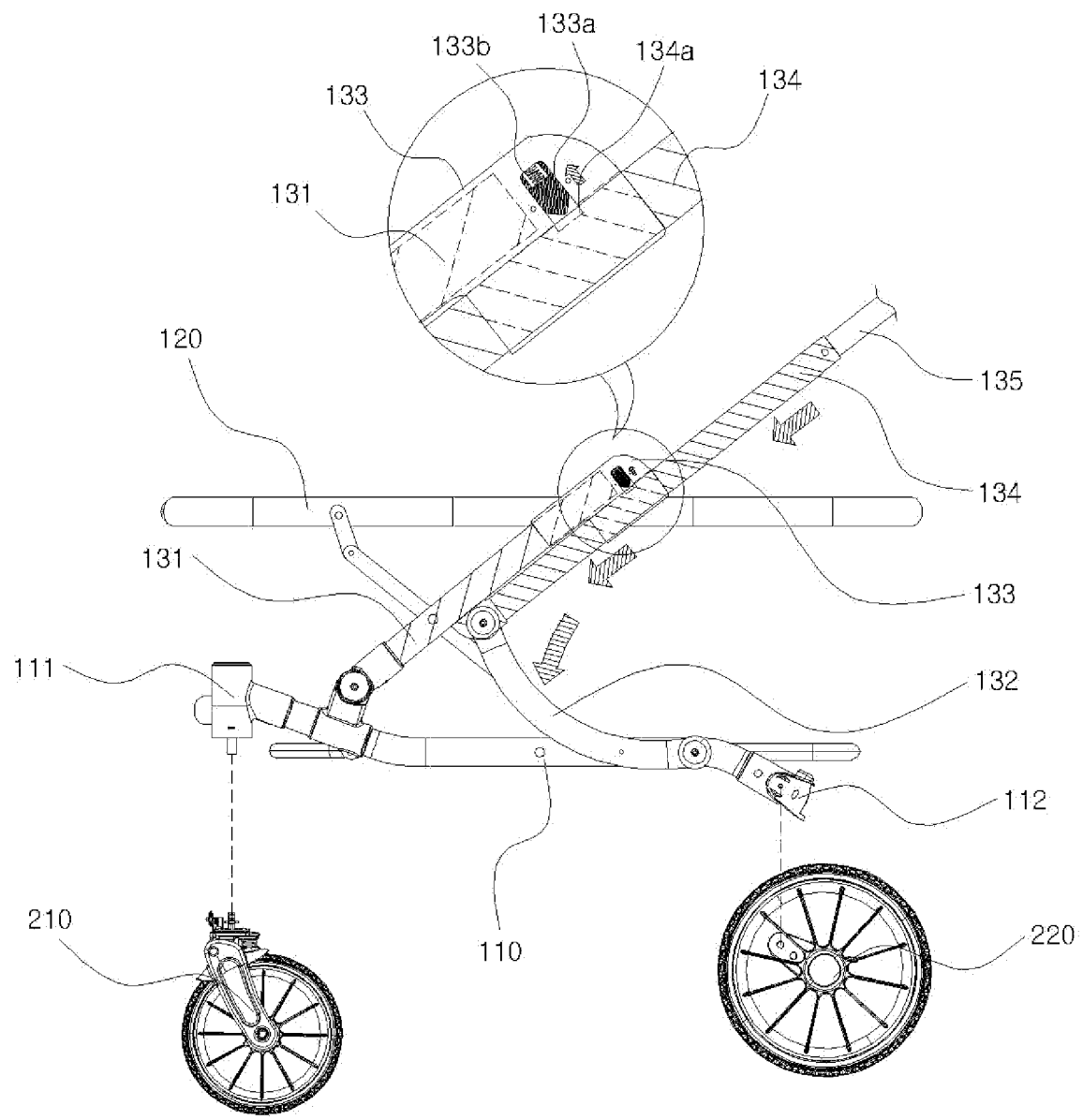
FIG. 12 is a side view showing the main body frame according to the present invention with an enlarged sectional view showing a portion of the internal structure of the side locking frame and a side view showing a state in which the side support frame is folded.
Figure 13:
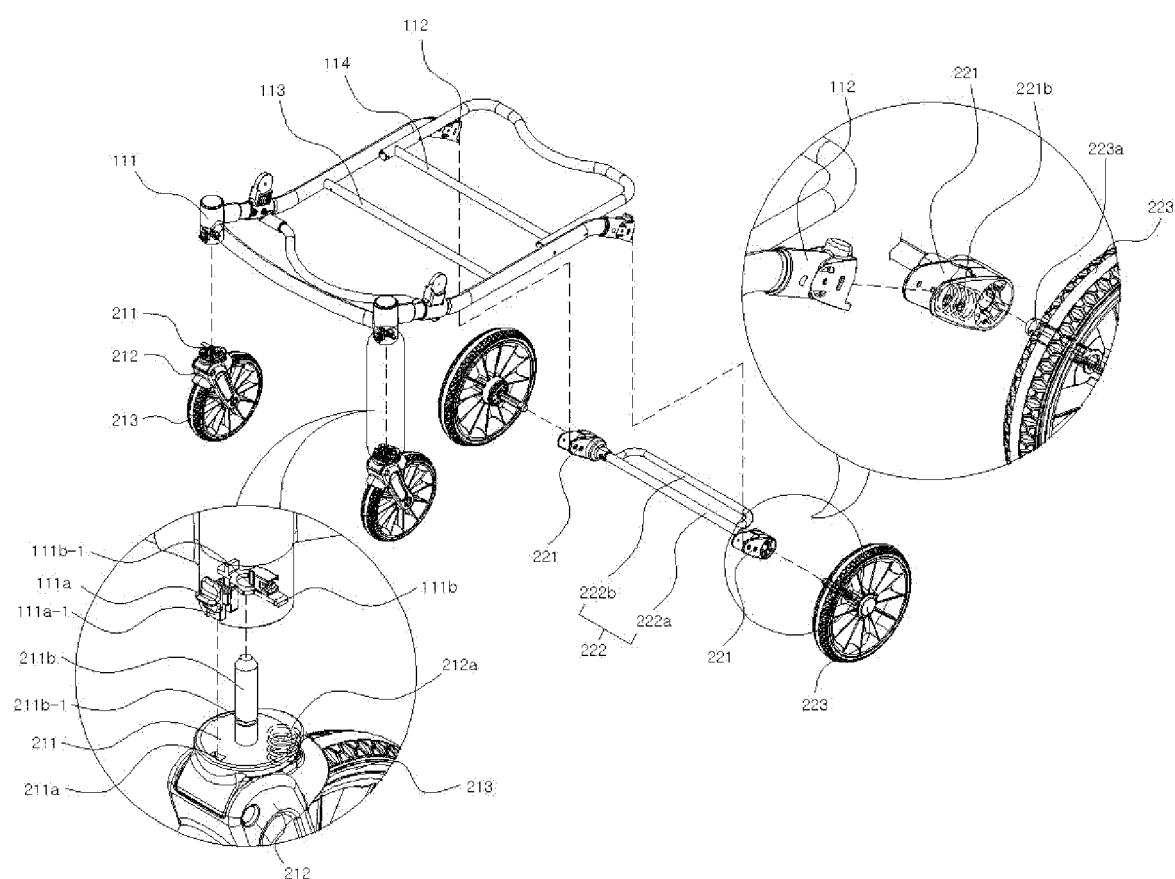
FIG. 13 is a view showing coupling of a wheel assembly, which is constituted by a front wheel unit and a rear wheel unit, to the lower end of a lower support frame according to the present invention with a partial enlarged view showing a portion of the coupling structure thereof.
Figure 14:
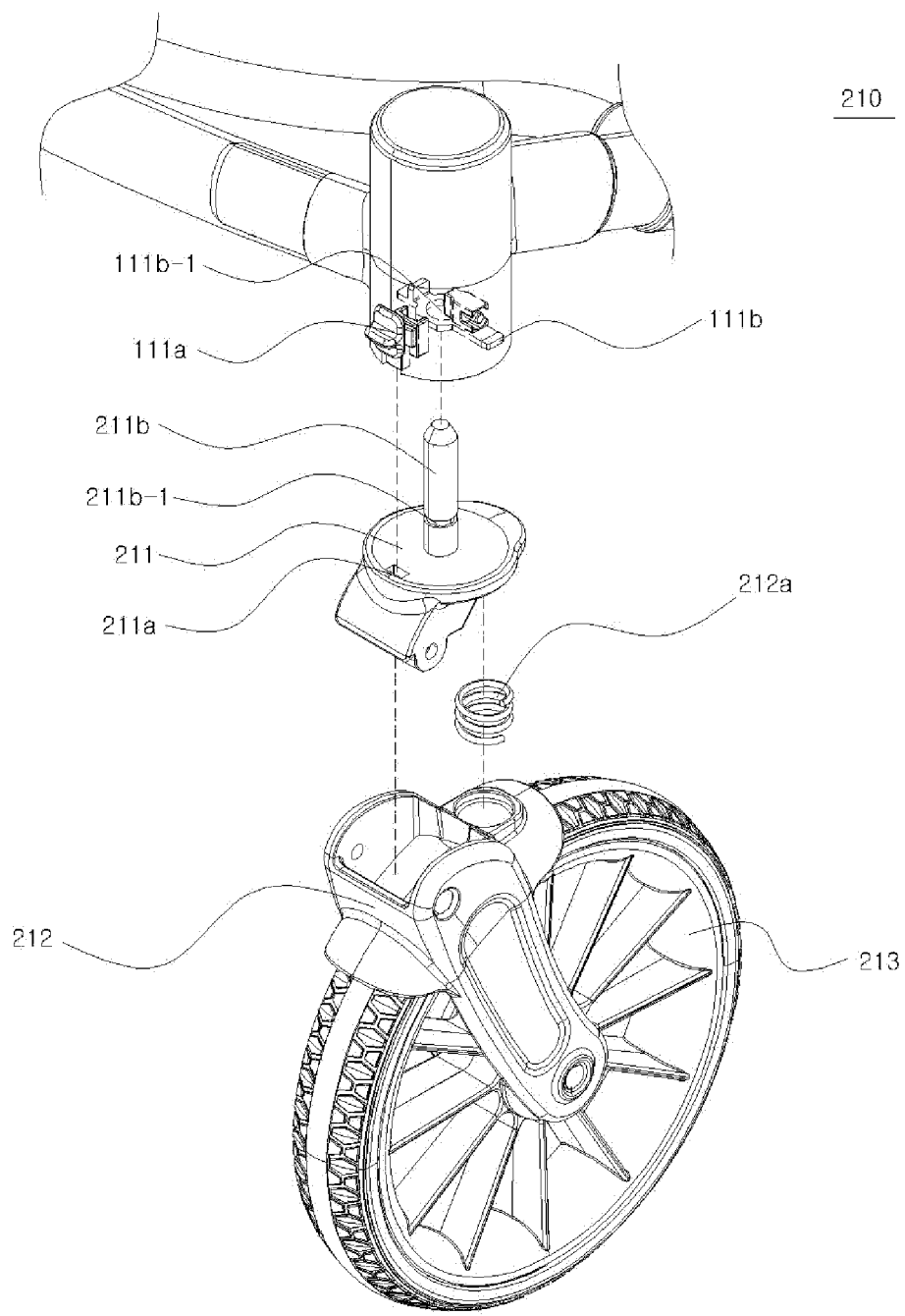
FIG. 14 is an exploded perspective view showing components of the front wheel unit according to the present invention.
Figure 15:
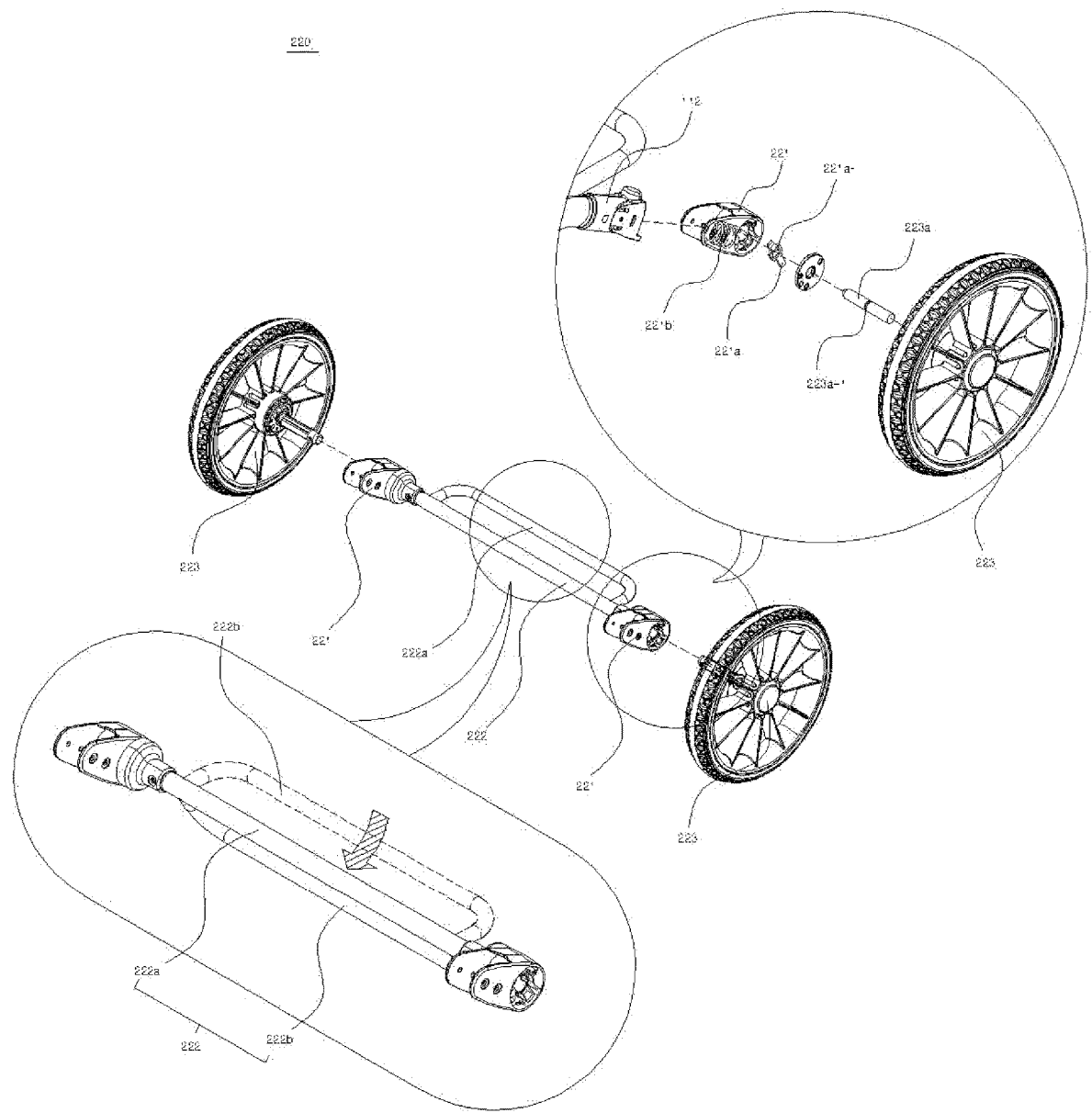
FIG. 15 is an exploded view showing components of the rear wheel unit according to the present invention with a partial enlarged view showing a portion of the coupling structure thereof.

In addition, an auxiliary link frame 133c is formed at the side locking frame 133 according to the present invention, as shown in FIG. 8.

Here, one side of the lower end of the auxiliary link frame 133c is coupled to the side locking frame and one side of the upper end of the auxiliary link frame 133c is axially coupled to one side of the upper support frame 120 to auxiliarily support the upper support frame, whereby axial rotation of the upper support frame is smoothly performed when the main body frame is folded or unfolded.

The lower handle frame 134 is a hollow frame. The upper handle frame is inserted into and coupled to the upper end of the lower handle frame in a longitudinal direction, and one side of the lower end of the lower handle frame is inserted through and coupled to the rear of the side locking frame. The lower handle frame is provided with a folding locking pin insertion hole 134a, length adjustment locking pin insertion holes 134b, and a slide protrusion 134c.

Here, the folding locking pin insertion hole 134a is formed in one side of the upper end surface of the lower end of the lower handle frame, and the folding locking pin 133a is detachably coupled to the folding locking pin insertion hole 134a.

Here, the length adjustment locking pin insertion holes 134b are formed in one side of the lower end surface of the lower end of the lower handle frame so as to be arranged at predetermined intervals in a longitudinal direction. Length adjustment locking pins 135c are detachably coupled to the length adjustment locking pin insertion holes 134b.

Here, the slide protrusion 134c is formed on the upper end surface of the tip of the lower end of the lower handle frame so as to protrude in a longitudinal direction. The slide protrusion is inserted into the slide groove 131a of the first side frame such that the lower handle frame is moved parallel to the first side frame in a longitudinal direction.

Consequently, the lower handle frame 134, which is movable in a longitudinal direction through one side of the lower end of the side locking frame, is moved upwards and downwards so as to slide relative to the first side frame 131 in a state of being parallel thereto.

When the mode of the baby wagon is switched between the folding mode and the usage mode, therefore, friction is minimized, whereby smooth folding is achieved.

Lower ends of left and right sides of the upper handle frame 135 are inserted into and coupled to the lower handle frame, and upper ends of left and right sides of the upper handle frame 135 are connected to each other while forming a handle. The upper handle frame includes a first safety locking button 135a, a second safety locking button 135b, and a length adjustment locking pin 135c.

Here, the first safety locking button 135a is formed on the lower end surface of the middle of the upper handle frame so as to protrude therefrom, and serves to lock and unlock the second safety locking button.

When the first safety locking button is pushed, the second safety locking button is pushed. When the first safety locking button is not pushed, the second safety locking button is not pushed.

Here, the second safety locking button 135b is formed on an inner surface of the middle of the upper handle frame so as to protrude therefrom, and the length adjustment locking pin 135c is connected to the inside of the second safety locking button via a wire, whereby the length adjustment locking pin 135c is moved so as to be detachably coupled to the length adjustment locking pin insertion hole 134b.

Here, the length adjustment locking pin 135c is configured to protrude from and be inserted into an inner surface of the lower end of the upper handle frame perpendicularly to a longitudinal direction. The length adjustment locking pin is connected to the second safety locking button 135b via a wire so as to be detached from or inserted into the length adjustment locking pin insertion hole 134b of the lower handle frame.

When the length adjustment locking pin 135c is separated from the length adjustment locking pin insertion hole 134b, the position of the upper handle frame inserted into the lower handle frame in a longitudinal direction may be changed. When the length adjustment locking pin 135c is inserted into the length adjustment locking pin insertion hole 134b, the upper handle frame is fixed to the lower handle frame.

When the first safety locking button 135a and the second safety locking button 135b of the upper handle frame 135 are simultaneously pushed, the length adjustment locking pin 135c connected to the inside of the upper handle frame via the wire is detached from the length adjustment locking pin insertion hole, whereby the height of the upper handle frame may be changed. When the length adjustment locking pin is inserted into the length adjustment locking pin insertion hole at an appropriate position depending on the height of the caregiver, the fixed height of the upper handle frame may be adjusted.

Consequently, the height of the upper handle frame may be adjusted depending on the height of the caregiver, and the upper handle frame may be fixed at an appropriate height.

In addition, when the first safety locking button 135a protruding from the lower end of the middle of the upper handle frame of the side support frame 130 according to the present invention and the second safety locking button 135b protruding from the front of the middle of the upper handle frame are simultaneously pushed, the length adjustment locking pin 135c fastened to the inside of the lower handle frame 134 via the wire is moved, whereby the upper handle frame fixed to the lower handle frame is unlocked and moved.

The upper handle frame 135 is unlocked only when the first safety locking button 135a and the second safety locking button 135b are simultaneously pushed, and therefore double safety locking of the side support frame 130 is achieved.

As a result, it is possible to prevent unintentional change in length of the upper handle frame or unintentional folding of the main body frame due to a mistake of the caregiver, whereby it is possible for the caregiver to move the baby wagon in the state in which the baby is safely in the baby wagon and for the baby to rest in the baby wagon.

In addition, when the upper handle frame 135 is maximally inserted into the inner end of the lower handle frame 134, the folding locking pin 133a formed at one side of the inside of the side locking frame 133 is moved, whereby the lower handle frame 134 is moved along the inside of the side locking frame 133 in parallel to the first side frame in a sliding manner, and therefore the side support frame 130 according to the present invention is folded.

When the side support frame is folded, the first side frame 131 and the lower handle frame 134 are folded in parallel to each other, whereby the degree of spacing between components constituting the main body frame in the folding mode is minimized. When the lower handle frame is moved in a longitudinal direction such that the baby wagon is folded, the first side frame and the lower handle frame are moved parallel to each other in the state in which the distance between the first side frame and the lower handle frame is not changed.

When the main body frame is folded, therefore, the overall volume of the folded frames is minimized, and friction is minimized due to movement performed in a sliding manner, whereby smooth folding is achieved.

Next, the wheel assembly 200 according to the present invention will be described.

The wheel assembly 200, which includes a front wheel unit 210 coupled to left and right sides of the front of the lower end of the main body frame in a symmetrical fashion and a rear wheel unit 220 coupled to left and right sides of the rear of the lower end of the main body frame in a symmetrical fashion, serves to move the baby wagon while supporting the baby wagon.

The front wheel unit 210 includes a front wheel detachment frame 211, a front wheel shock absorbing frame 212, and a front wheel 213.

The front wheel detachment frame 211 is inserted into and coupled to left and right sides of the lower end of the front of the lower support frame of the main body frame. The front wheel shock absorbing frame is coupled to the lower end of the front wheel detachment frame. The front wheel detachment frame is provided with a rotation prevention recess 211a and a front wheel detachment bar 211b.

Here, the rotation prevention recess 211a is a vertical recess formed in one side of the front of the upper end surface of the front wheel detachment frame, and a rotation prevention pin protruding to the lower end of the inside of the rotation prevention switch 111a of the front wheel coupling portion is inserted into or separated from the rotation prevention recess.

When the rotation prevention pin of the rotation prevention switch is inserted into the rotation prevention recess 211a, the front wheel is prevented from being rotated about a central axis in the horizontal direction, and the front wheel is fixed in a forward direction, whereby the baby wagon is smoothly moved in a straight direction. When the rotation prevention pin of the rotation prevention switch is separated from the rotation prevention recess, the front wheel is not fixed in a specific direction but is rotatable 360 degrees in a horizontal direction, whereby smooth direction change of the baby wagon is guided, and necessary force is reduced at the time of direction change, whereby caregiver fatigue is reduced.

Here, the front wheel detachment bar 211b is a cylindrical bar formed upright at the middle of the upper end surface of the front wheel detachment frame. The front wheel detachment bar is detachably coupled to the middle of the lower end surface of the front wheel coupling portion, forms a rotating shaft, and serves to detachably couple the front wheel unit to the main body frame.

Specifically, when one side of the detachment frame recess 111b-1 of the front wheel detachment switch 111b is inserted into a detachment recess 211b-1 formed along the circumference of one side of the upper end of the front wheel detachment bar 211b, the front wheel detachment bar is fixed. When the front wheel detachment switch 111b is pushed and the detachment frame recess 111b-1 is separated from the detachment recess 211b-1, the front wheel unit 210 coupled to the main body frame 100 is detached from the main body frame.

In the folding mode, therefore, the front wheel unit 210, the protruding region of which is large and the volume of which is large, may be separated from the main body frame 100, whereby it is possible to reduce the volume of the baby wagon 1, and therefore it is possible to easily store the baby wagon. In addition, when the front wheel unit 210 is damaged, it is possible to easily replace the damaged front wheel unit.

The front wheel is coupled to the middle of the lower end of the front wheel shock absorbing frame 212 so as to be supported, and a shock absorbing elastic spring 212a is formed at one side of the rear of the upper end of the front wheel shock absorbing frame to support the front wheel shock absorbing frame in the state in which the shock absorbing elastic spring is interposed between the front wheel detachment frame and the front wheel shock absorbing frame.

Here, the shock absorbing elastic spring 212a is interposed between the front wheel detachment frame 211 and the front wheel shock absorbing frame 212 so as to have elasticity in the upward and downward direction in order to absorb shock applied to the front wheel unit 210. That is, the shock absorbing elastic spring serves as a suspension.

The front wheel 213 is coupled to left and right sides of the lower end of the front wheel shock absorbing frame, supports the lower end of the front of the baby wagon, and serves to move the baby wagon while being rotated.

The rear wheel unit 220 includes a rear wheel support frame 221, a brake shaft 222, and a rear wheel 223.

The rear wheel support frame 221, which is a frame formed at one side of the lower end so as to be inclined rearwards, is coupled to left and right sides of the lower end of the rear of the main body frame in a symmetrical fashion, and is configured to receive a rear wheel detachment switch 221a and a shock absorbing elastic spring 221b therein.

When one side of a detachment frame recess 221b-1 inside the rear wheel detachment switch 221a is inserted into a detachment recess 223a-1 of the rear wheel detachment bar, the rear wheel is coupled. When the rear wheel detachment switch 221a is pushed to move the detachment frame recess 221b-1, the detachment frame recess is detached from the detachment recess 223a-1 of the rear wheel detachment bar, whereby the rear wheel may be separated.

In the folding mode, therefore, the rear wheel 223, the protruding region of which is large and the volume of which is large, may be separated from the main body frame 100, whereby it is possible to reduce the volume of the baby wagon 1, and therefore it is possible to easily store the baby wagon. In addition, when the rear wheel is damaged, it is possible to easily replace the damaged rear wheel.

The shock absorbing elastic spring 221b is interposed between the rear wheel coupling portion 112 and the rear wheel support frame 221 so as to have elasticity in the upward and downward direction in order to absorb shock applied to the rear wheel unit 220. That is, the shock absorbing elastic spring serves as a suspension.

In addition, the rear wheel support frame 221 according to the present invention is formed in left-right symmetry. The brake shaft 222 is connected to one side of the inner surface of the rear wheel support frame by coupling, and a rear wheel detachment bar 223a of the rear wheel 223 is inserted into and coupled to a recess formed in the middle of the outer surface of the rear wheel support frame.

The brake shaft 222 includes a round-bar-shaped stationary shaft rod 222a and a rotating shaft rod 222b coupled to left and right sides of the rear of the stationary shaft rod so as to be parallel thereto.

The rotating shaft rod 222b is rotatable about the stationary shaft rod 222a, which serves as a rotating shaft, to control the rotation of the rear wheel, i.e., to lock or unlock the rotation of the rear wheel.

When the rotating shaft rod 222b is rotated downwards about the stationary shaft rod 222a at the rear of the stationary shaft rod, the rotation of the rear wheel 223 is locked, whereby braking is performed. When the rotating shaft rod 222b is rotated upwards about the stationary shaft rod 222a at the rear of the stationary shaft rod, the locked rotation of the rear wheel 223 is released, whereby the rear wheel is smoothly rotated to move the baby wagon.

The rear wheel detachment bar 223a, which protrudes from the middle of the inner surface of the rear wheel 223 in a direction perpendicular to the inside thereof, is coupled to the middle of the outer surface of the rear wheel support frame in order to support the lower end of the rear surface of the baby wagon, and serves to move the baby wagon while being rotated.

The rear wheel includes the rear wheel detachment bar 223a, which is provided at the middle of the inner surface thereof.

Here, the rear wheel detachment bar 223a, which is a round bar protruding from a central axis of the inner surface of the rear wheel perpendicularly thereto, is detachably coupled to the middle of the outer surface of the rear wheel support frame, forms a rotating shaft, and serves to detachably couple the rear wheel to the main body frame.

Specifically, when one side of the detachment frame recess 221b-1 of the rear wheel detachment switch 221b is inserted into a detachment recess 223a-1 formed along the circumference of one side of the inside of the rear wheel detachment bar 223a, the rear wheel detachment bar is fixed. When the rear wheel detachment switch 221b is pushed and the detachment frame recess 221b-1 is separated from the detachment recess 223a-1, the rear wheel 223 coupled to the main body frame 100 is detached from the main body frame.

In the folding mode, therefore, the rear wheel 223, the protruding region of which is large and the volume of which is large, may be separated from the main body frame 100, whereby it is possible to reduce the volume of the baby wagon 1, and therefore it is possible to easily store the baby wagon. In addition, when the rear wheel 223 is damaged, it is possible to easily replace the damaged rear wheel.

Next, the seat 300 according to the present invention will be described.

The seat 300 is formed in the shape of a rectangular basket. The seat 300 is coupled and fixed to the inner circumference and the lower end of the main body frame. The seat serves to provide a space in which the baby can comfortably rest in the baby wagon.

The seat is coupled to the inside of the main body frame using at least one of a snap fastener, a buckle, Velcro tape, and a zipper.

The seat 300 according to the present invention includes a chair backrest seat 310, a standing chair formation portion 320, and a tray 330.

The chair backrest seat 310 is formed at the front and the rear of the inside of the seat in symmetry, and the backrest angle of the chair backrest seat 310 is adjusted and fixed. A five-point coupling type safety belt is formed at each of the front and the rear of the chair backrest seat so as to face each other, whereby the shoulders, the waist, and the thighs of the baby are supported so as not to shake.

The five-point coupling type safety belt surrounds the entirety of the upper body. Consequently, babies and children of various ages, including babies who cannot keep themselves steady and children, can ride in the baby wagon.

As described above, the chair backrest seat 310 fixes the baby in a stable and comfortable pose through the five-point coupling type safety belt, whereby the baby in the seat may keep a stable pose even when the baby wagon is shaken or even when external impact is applied to the baby wagon, and therefore the ride comfort of the baby may be improved.

In addition, the backrest angle of the chair backrest seat 310 may be easily adjusted through adjustment of the length of a length adjustment belt coupled to the interior of the main body frame, whereby the baby may keep a comfortable pose depending on physical conditions of the baby, such as age and physical growth of the baby, and therefore the ride comfort of the baby may be improved. As a result, satisfaction of the baby and the caregiver when using the baby wagon may be improved.

The standing chair formation portion 320 is configured such that a zipper 321 is formed at left and right sides of the front and the rear of one side of the middle of the lower end surface of the seat, and a quadrangular pocket 322 formed in a downward direction is folded or unfolded by the zipper, whereby a standing chair mode or a leg chair mode is selectively formed. In other words, when the zipper is open, the quadrangular pocket 322 will be formed to be the standing chair mode. The zipper 321 can be formed with two side lines in parallel with each other, or can be formed in a loop with a rectangular shape having four sides, an oval shape, or a circular shape or the like.

Here, the outside of the zipper 321 of the standing chair formation portion 320 is located at the front and the rear of one side of the middle of the lower end surface of the seat, and the outside of the zipper 321 of the standing chair formation portion 320 is located at the front and the rear of the lower end of the quadrangular pocket 322 that is unfolded downwards.

When the zipper 321 of the standing chair formation portion 320 is opened to unfold the quadrangular pocket 322 downwards, it is possible to for the baby in the baby wagon to sit in the seat 300 in the standing chair mode. When the quadrangular pocket 322 is folded upwards and the zipper 321 is closed such that the lower end surface of the seat is flat, it is possible to for the baby in the baby wagon to sit in the seat 300 in the leg chair mode.

Consequently, the mode of the seat may be changed to the standing chair mode or the leg chair mode depending on the condition or demand of the baby in the baby wagon such that the baby can sit or lie down. Even when the baby is in the baby wagon for a long time, therefore, comfort of the baby may be maintained.

The tray 330, which has a quadrangular tray shape, is provided at left and right outer surfaces thereof with fixing clips 331, which are formed so as to extend vertically downwards and by which the tray is detachably coupled to a side upper end frame having a left-right symmetry structure.

The fixing clips 331 are coupled and fixed to left and right sides of the upper support frame 120 in symmetry.

As a result, it is possible to prevent articles, toys, or food on the tray from shaking or falling therefrom.

Next, the canopy 400 according to the present invention will be described.

The canopy 400 is detachably coupled to the upper end of the main body frame, and serves to protect the baby from an external environment, such as sunlight, rain, or wind.

The canopy 400 includes a wagon canopy 410 and a baby carrier canopy 420.

In the canopy according to the present invention, one of the wagon canopy 410 and the baby carrier canopy 420 is selected and detachably coupled to the upper end of the main body frame 100.

The wagon canopy 410 is configured such that a plurality of semi-elliptical frames is formed in left-right symmetry and is rotated about a plurality of rotating shafts in the upward and downward direction. The wagon canopy includes a first canopy frame 411a coupled to a first canopy rotating shaft 411, a second canopy frame 412a coupled to a second canopy rotating shaft 412, a third canopy frame 413a coupled to a third canopy rotating shaft 413, and a fourth canopy frame 414a coupled to a fourth canopy rotating shaft 414.

Here, the first canopy rotating shaft 411 is coupled to a canopy coupling bracket formed at the front, which is one of two brackets formed at the lower handle frame 134 in a state of being spaced apart from each other in left-right symmetry, in order to support the front of the wagon canopy 410, to support the first canopy frame 411a coupled in a semi-elliptical shape, and to rotate the first canopy frame about the rotating shaft in the forward and rearward direction.

Here, the second canopy rotating shaft 412 is fixed to the first canopy frame 411a in left-right symmetry in order to support the second canopy frame 412a coupled at the front and to rotate the second canopy frame about the rotating shaft in the forward and rearward direction.

Here, the third canopy rotating shaft 413 is fixed to the second canopy frame 412a in left-right symmetry in order to support the semi-elliptical third canopy frame 413a coupled at the front and to rotate the third canopy frame about the rotating shaft in the forward and rearward direction.

Here, the fourth canopy rotating shaft 414 is coupled to a canopy coupling bracket formed at the rear, which is the other of the two brackets formed at the lower handle frame 134 in a state of being spaced apart from each other in left-right symmetry, in order to support the rear of the wagon canopy 410, to support the fourth canopy frame 414a coupled in a semi-elliptical shape, and to rotate the fourth canopy frame about the rotating shaft in the forward and rearward direction.

The first canopy frame 411*a*, the second canopy frame 412*a*, the third canopy frame 413*a*, and the fourth canopy frame 414*a* are rotated through the first canopy rotating shaft 411, the second canopy rotating shaft 412, the third canopy rotating shaft 413, and the fourth canopy rotating shaft 414, whereby it is possible to unfold or fold a wagon canopy sheet sequentially coupled thereto.

In the wagon canopy 410, as described above, the first canopy frame, the second canopy frame, the third canopy frame, and the fourth canopy frame are connected to each other via the wagon canopy sheet, and are easily folded or unfolded about the rotating shafts thereof by one touch. The four rotating shafts serve as joints, whereby switching between the usage mode and the folding mode is smoothly performed, and the volume of the wagon canopy is minimized in the folding mode.

In addition, a zipper is formed in the wagon canopy sheet formed along the circumference of one side of the wagon canopy, whereby it is possible to easily separate and couple the wagon canopy sheet from and to the wagon canopy.

Consequently, the wagon canopy sheet may be detached from the wagon canopy such that the wagon canopy sheet can be easily washed, and may then be coupled to the wagon canopy after washing.

The baby carrier canopy 420 is configured such that a plurality of semi-elliptical frames is unfolded or folded so as to have a fan-shaped side surface about a rotating shaft 421 formed in left-right symmetry, and is coupled to the upper ends of the front and the rear of the main body frame in symmetry. The baby carrier canopy includes a first canopy rotating shaft frame 422, a second canopy rotating shaft frame 423, a third canopy rotating shaft frame 424, and a fixing clip 425.

The first canopy rotating shaft frame 422, which is a semi-elliptical frame coupled to the outside of the rotating shaft having the left-right symmetry structure, is coupled to the circumference of the front of a baby carrier canopy sheet so as to support the baby carrier canopy sheet.

The second canopy rotating shaft frame 423, which is a semi-elliptical frame, is coupled to the circumference of the middle of the baby carrier canopy sheet so as to support the baby carrier canopy sheet while maintaining the shape of the baby carrier canopy sheet.

The third canopy rotating shaft frame 424, which is a semi-elliptical frame coupled to the inside of the rotating shaft having the left-right symmetry structure, is coupled to the circumference of the rear of the baby carrier canopy sheet so as to support the baby carrier canopy sheet.

The fixing clip 425 is formed at the lower ends of left and right sides of the baby carrier canopy 420 in symmetry in a vertical downward direction so as to be detachably coupled to the upper support frame in left-right symmetry.

The fixing clip is coupled and fixed to left and right sides of the front and the rear of the upper support frame 120 in symmetry.

As a result, the baby carrier canopy 420 coupled at the front and the rear may be easily detachably coupled to the main body frame.

In the baby carrier canopy 420 according to the present invention, the first canopy rotating shaft frame is pulled about the rotating shaft 421 in a direction toward the inside of the third canopy rotating shaft frame such that the second canopy rotating shaft frame and the first canopy rotating shaft frame are sequentially unfolded, whereby the inner surface of a baby carrier canopy sheet may be exposed outwards, and therefore the baby carrier canopy sheet may be reversed in the opposite direction.

The outer surface and the inner surface of the baby carrier canopy sheet may be formed so as to have different colors or different materials, and the outer surface and the inner surface of the baby carrier canopy sheet may be used while being reversed.

For example, when the outer surface of the baby carrier canopy sheet is formed so as to have a white color and the inner surface of the baby carrier canopy sheet is formed so as to have a black color, the white outer surface of the baby carrier canopy sheet is exposed outwards to reflect light in the case in which the baby feels hot, and the outer surface of the baby carrier canopy sheet is reversed such that the black surface of the baby carrier canopy sheet is exposed outwards in order to absorb light in the case in which the baby feels cold. The baby carrier canopy sheet may be manufactured so as to have various colors in response to demand of consumers.

In the baby carrier canopy 420, as described above, the outer surface and the inner surface of the baby carrier canopy sheet may be formed so as to have different colors, different materials, or different patterns, and one of the outer surface and the inner surface of the baby carrier canopy sheet may be selectively exposed outwards by reversal based on taste of the caregiver or the purpose of use of the baby carrier canopy sheet.

Also, in the baby carrier canopy 420, the first canopy rotating shaft frame, the second canopy rotating shaft frame, and the third canopy rotating shaft frame are connected to each other via the baby carrier canopy sheet, and are easily folded or unfolded about the rotating shaft thereof by one touch. The rotating shaft serves as a joint, whereby switching between the usage mode and the folding mode is smoothly performed, and the volume of the baby carrier canopy is minimized in the folding mode.

In addition, a zipper is formed in the baby carrier canopy sheet formed along the circumference of one side of the baby carrier canopy, whereby it is possible to easily separate and couple the baby carrier canopy sheet from and to the baby carrier canopy.

Consequently, the baby carrier canopy sheet may be detached from the baby carrier canopy such that the baby carrier canopy sheet can be easily washed, and may then be coupled to the baby carrier canopy after washing.

Hereinafter, the operation of the baby wagon having improved ease of use according to the present invention will be described in detail.

First, the upper handle frame of the baby wagon stored in the folding mode is lifted upwards, and the upper handle frame is maximally pulled while one side of the rear wheel unit is supported by the foot of the caregiver in order to fix the main body frame.

At this time, the side support frame, which is laid down, is erected, and the upper support frame is raised horizontally, whereby the main body frame is unfolded.

Subsequently, the first safety locking button and the second safety locking button are simultaneously pushed, and the fixed height of the upper handle frame is changed depending on the height of the caregiver.

Subsequently, the mode of the seat is changed to the standing chair mode or the leg chair mode depending on the condition or demand of the baby in the baby wagon such that the baby can sit or lie down.

Even when the baby is in the baby wagon for a long time, therefore, comfort of the baby may be maintained.

Subsequently, one of the wagon canopy and the baby carrier canopy is coupled to the main body frame through selection of the caregiver such that the baby wagon is used in the state in which the upper end of the baby wagon is prevented from being exposed outwards.

Subsequently, in order to store the baby wagon, the use of which is completed, the canopy frames are folded by one touch and are brought into tight contact with the upper end of the main body frame.

Subsequently, the front handle assembly and the basket frame are rotated in a direction toward the inside of the seat frame so as to be folded.

Finally, the first safety locking button and the second safety locking button of the upper handle frame are simultaneously pushed, and the upper handle frame is pushed to the inner end of the lower handle frame, and the side support frame is rotated, whereby the main body frame is folded.

When a storage space is small depending on a storage situation, the front wheel and the rear wheel may be detached from the main body frame so as to be separately stored.

As is apparent from the above description, the present invention has effects in that the folding structure of the baby wagon is stably configured, whereby damage to the frames, such as twisting or bending of the frames, is prevented, in that the baby wagon is stably folded and unfolded, whereby the use of the baby wagon is convenient while durability of the baby wagon is excellent, in that the mode of the seat is changed to the standing chair mode or the leg chair mode depending on the condition or demand of the baby such that the baby can sit or lie down, whereby comfort of the baby is maintained even when the baby is in the baby wagon for a long time, in that the frames are manufactured so as to be easily folded even in the state in which the canopy is coupled thereto, whereby the baby wagon is unfolded and folded within a short time, in that portability and mobility of the baby wagon are excellent, whereby it is possible to easily install the baby wagon, and in that detachment and coupling of the canopy and the wheel assembly are easily performed, whereby it is possible to easily carry and store the baby wagon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A baby wagon comprising a main body frame, a wheel assembly, a seat, and a canopy,
   wherein the main body frame includes:
   a lower support frame coupled to the wheel assembly;
   an upper support frame for supporting the seat; and
   a side support frame coupled to the lower support frame and to the upper support frame through a hinge structure such that the side support frame is configured to be folded or unfolded through the hinge structure and a shape of the side support frame is configured to change,
   wherein the lower support frame includes a lower side frame, a lower front frame connected with the lower side frame, and a lower rear frame connected with the lower side frame, and
   wherein the side support frame includes:
   a first side frame having a lower end axially coupled to a front portion of the lower side frame, and an upper end coupled to a side locking frame; and
   a second side frame having a lower end axially coupled to a rear portion of the lower side frame, and an upper end axially coupled to a lower handle frame,
   wherein the side locking frame includes an opening to receive the upper end of the first side frame, and a through-hole formed parallel to the first side frame, and a lower end of the lower handle frame is coupled to the side locking frame through the through-hole, and the side locking frame is configured to lock or unlock movement of the lower handle frame,
   wherein an upper handle frame is inserted into and coupled to an upper end of the lower handle frame in a longitudinal direction thereof, and
   wherein the upper support frame includes a front handle assembly coupled to a front of the upper support frame through a rotating shaft structure, the front handle assembly including a handle being disposed at an end thereof so as to be rotatably coupled thereto.

2. The baby wagon according to claim 1, wherein the lower support frame includes a front inner frame coupled to a left and a right inner sides thereof, and a rear inner frame coupled to the left and the right inner sides and disposed in parallel with the front inner frame with a distance from each other.

3. The baby wagon according to claim 1,
   wherein the canopy is a wagon canopy comprising:
   a first canopy frame having two ends respectively coupled to two first canopy rotating shafts coupled to the side support frame;
   two second canopy frames respectively coupled to two second canopy rotating shafts coupled to left and right portions of the first canopy frame;
   a third canopy frame having two ends respectively coupled to two third canopy rotating shafts respectively coupled to the two second canopy frames; and
   a fourth canopy frame having two ends respectively coupled to two fourth canopy rotating shafts coupled to the side support frame,
   wherein the first canopy frame and the fourth canopy frame are disposed parallel to each other when the canopy is completely unfolded, and
   wherein the wagon canopy is detachably coupled to the main body frame.

4. The baby wagon according to claim 1, wherein the canopy is a baby carrier canopy configured to be unfolded or folded so as to have a fan-shaped side surface about a rotating shaft, and detachably coupled to the main body frame.

5. The baby wagon according to claim 4, wherein the baby carrier canopy includes:
   a first canopy rotating shaft frame formed in a semi-elliptical shape, coupled to an outside of the rotating shaft, and coupled to a circumference of a front of a baby carrier canopy sheet so as to support the baby carrier canopy sheet;
   a second canopy rotating shaft frame formed in a semi-elliptical shape, and coupled to a circumference of a middle of the baby carrier canopy sheet so as to support the baby carrier canopy sheet while maintaining a shape of the baby carrier canopy sheet; and
   a third canopy rotating shaft frame formed in a semi-elliptical shape, coupled to an inside of the rotating shaft, and coupled to a circumference of a rear of the baby carrier canopy sheet so as to support the baby carrier canopy sheet.

6. The baby wagon according to claim 5, wherein the first canopy rotating shaft frame is configured to be pulled about the rotating shaft in a direction toward the third canopy rotating shaft frame such that the second canopy rotating shaft frame and the first canopy rotating shaft frame are sequentially unfolded, such that an inner surface of the baby carrier canopy sheet is exposed outwards, and therefore the baby carrier canopy sheet is reversed in an opposite direction.

7. A baby wagon comprising a main body frame, a wheel assembly, a seat, and a canopy,
wherein the main body frame includes:
a lower support frame coupled to the wheel assembly;
an upper support frame for supporting the seat; and
a side support frame coupled to the lower support frame and to the upper support frame through a hinge structure such that the side support frame is configured to be folded or unfolded through the hinge structure and a shape of the side support frame is configured to change,
wherein the lower support frame includes a lower side frame, a lower front frame connected with the lower side frame, and a lower rear frame connected with the lower side frame, and
wherein the side support frame includes:
a first side frame having a lower end axially coupled to a front portion of the lower side frame, and an upper end coupled to a side locking frame; and
a second side frame having a lower end axially coupled to a rear portion of the lower side frame, and an upper end axially coupled to a lower handle frame,
wherein the side locking frame includes an opening to receive the upper end of the first side frame, and a through-hole formed parallel to the first side frame, and a lower end of the lower handle frame is coupled to the side locking frame through the through-hole, and the side locking frame is configured to lock or unlock movement of the lower handle frame,
wherein an upper handle frame is inserted into and coupled to an upper end of the lower handle frame in a longitudinal direction thereof,
wherein the upper handle frame includes a first safety locking button protruding from one side of a middle of the upper handle frame and a second safety locking button protruding from another aide of the middle of the upper handle frame, and
wherein the lower handle frame includes a length adjustment locking pin connected with the first and second safety locking buttons through a wire, such that, when the first safety locking button and the second safety locking button are simultaneously pushed, the length adjustment locking pin fastened to an inside of the lower handle frame is moved, and the upper handle frame fixed to the lower handle frame is unlocked and moved.

8. A baby wagon comprising a main body frame, a wheel assembly, a seat, and a canopy,
wherein the main body frame includes:
a lower support frame coupled to the wheel assembly;
an upper support frame for supporting the seat; and
a side support frame coupled to the lower support frame and to the upper support frame through a hinge structure such that the side support frame is configured to be folded or unfolded through the hinge structure and a shape of the side support frame is configured to change,
wherein the lower support frame includes a lower side frame, a lower front frame connected with the lower side frame, and a lower rear frame connected with the lower side frame, and
wherein the side support frame includes:
a first side frame having a lower end axially coupled to a front portion of the lower side frame, and an upper end coupled to a side locking frame; and
a second side frame having a lower end axially coupled to a rear portion of the lower side frame, and an upper end axially coupled to a lower handle frame,
wherein the side locking frame includes an opening to receive the upper end of the first side frame, and a through-hole formed parallel to the first side frame, and a lower end of the lower handle frame is coupled to the side locking frame through the through-hole, and the side locking frame is configured to lock or unlock movement of the lower handle frame,
wherein an upper handle frame is inserted into and coupled to an upper end of the lower handle frame in a longitudinal direction thereof, and
wherein the side support frame is configured such that, when the upper handle frame is maximally inserted into an inner end of the lower handle frame, a folding locking pin formed at an inside of the side locking frame is moved, such that the lower handle frame is moved along an inside of the side locking frame in a sliding manner, and therefore the side support frame is folded.

9. A baby wagon comprising a main body frame, a wheel assembly, a seat, and a canopy,
wherein the main body frame includes:
a lower support frame coupled to the wheel assembly;
an upper support frame for supporting the seat; and
a side support frame coupled to the lower support frame and to the upper support frame through a hinge structure such that the side support frame is configured to be folded or unfolded through the hinge structure and a shape of the side support frame is configured to change,
wherein the lower support frame includes a lower side frame, a lower front frame connected with the lower side frame, and a lower rear frame connected with the lower side frame, and
wherein the side support frame includes:
a first side frame having a lower end axially coupled to a front portion of the lower side frame, and an upper end coupled to a side locking frame; and
a second side frame having a lower end axially coupled to a rear portion of the lower side frame, and an upper end axially coupled to a lower handle frame,
wherein the side locking frame includes an opening to receive the upper end of the first side frame, and a through-hole formed parallel to the first side frame, and a lower end of the lower handle frame is coupled to the side locking frame through the through-hole, and the side locking frame is configured to lock or unlock movement of the lower handle frame,
wherein an upper handle frame is inserted into and coupled to an upper end of the lower handle frame in a longitudinal direction thereof, and
wherein the seat includes a standing chair formation portion configured such that a zipper is formed at a middle of a lower surface of the seat and such that quadrangular pocket having a quadrangular structure formed in a downward direction when the zipper is open, thereby selecting a standing chair mode or a leg chair mode.

10. A baby wagon comprising a main body frame, a wheel assembly, a seat, and a canopy,
wherein the main body frame includes:
a lower support frame coupled to the wheel assembly;
an upper support frame for supporting the seat; and
a side support frame coupled to the lower support frame and to the upper support frame through a hinge structure such that the side support frame is configured to be folded or unfolded through the hinge structure and a shape of the side support frame is configured to change, wherein the lower support frame includes a lower side frame, a lower front frame connected with the lower side frame, and a lower rear frame connected with the lower side frame, and wherein the side support frame includes:

a first side frame having a lower end axially coupled to a front portion of the lower side frame, and an upper end coupled to a side locking frame; and a second side frame having a lower end axially coupled to a rear portion of the lower side frame, and an upper end axially coupled to a lower handle frame, wherein the side locking frame includes an opening to receive the upper end of the first side frame, and a through-hole formed parallel to the first side frame, and a lower end of the lower handle frame is coupled to the side locking frame through the through-hole, and the side locking frame is configured to lock or unlock movement of the lower handle frame, wherein an upper handle frame is inserted into and coupled to an upper end of the lower handle frame in a longitudinal direction thereof, wherein the lower support frame includes a front inner frame coupled to a left and a right inner sides thereof, and a rear inner frame coupled to the left and the right inner sides and disposed in parallel with the front inner frame with a distance from each other, and wherein the front inner frame includes a first leg rest support frame having one end hinge-coupled to the front inner frame, such that the first leg rest support frame is configured to rotate at the one end to be connected with the rear inner frame at another end thereof, wherein the rear inner frame has a second leg rest support frame having one end hinge-coupled to the rear inner frame, such that the second leg rest support frame is configured to rotate at the one end thereof to be connected with the front inner frame at another end thereof.

* * * * *